(12) United States Patent
Okada et al.

(10) Patent No.: US 10,585,275 B2
(45) Date of Patent: Mar. 10, 2020

(54) MICROSCOPE DEVICE, MICROSCOPE SYSTEM, AND IMAGING METHOD

(71) Applicant: Sysmex Corporation, Kobe-shi, Hyogo (JP)

(72) Inventors: Masaya Okada, Kobe (JP); Shigeki Iwanaga, Kobe (JP)

(73) Assignee: Sysmex Corporation, Kobe (JP)

( * ) Notice: Subject to any disclaimer, the term of this patent is extended or adjusted under 35 U.S.C. 154(b) by 138 days.

(21) Appl. No.: 15/701,781

(22) Filed: Sep. 12, 2017

(65) Prior Publication Data

US 2018/0074308 A1 Mar. 15, 2018

(30) Foreign Application Priority Data

Sep. 12, 2016 (JP) ................................ 2016-177891

(51) Int. Cl.
| | |
|---|---|
| G02B 21/36 | (2006.01) |
| G02B 21/06 | (2006.01) |
| G02B 21/16 | (2006.01) |
| G02B 21/28 | (2006.01) |
| H04N 5/225 | (2006.01) |
| H04N 5/232 | (2006.01) |
| G02B 21/26 | (2006.01) |

(52) U.S. Cl.
CPC ........... *G02B 21/368* (2013.01); *G02B 21/06* (2013.01); *G02B 21/16* (2013.01); *G02B 21/28* (2013.01); *H04N 5/2256* (2013.01); *H04N 5/23293* (2013.01); *G02B 21/26* (2013.01)

(58) Field of Classification Search
CPC ................................................... G02B 21/368
See application file for complete search history.

(56) References Cited

U.S. PATENT DOCUMENTS

| | | | |
|---|---|---|---|
| 3,900,252 A | | 8/1975 | Salvo et al. |
| 4,206,966 A | * | 6/1980 | Tyson .................. G02B 21/364 353/39 |
| 6,154,562 A | * | 11/2000 | Baldur .................... F42B 35/00 382/108 |
| 7,851,753 B2 | * | 12/2010 | Uto .................. G01N 21/95607 250/306 |

(Continued)

FOREIGN PATENT DOCUMENTS

| | | |
|---|---|---|
| EP | 1598689 A2 | 11/2005 |
| EP | 1598689 A3 | 10/2006 |

(Continued)

OTHER PUBLICATIONS

Motorised Movable Top Plate (MMTP); 2012. (Year: 2012).*

(Continued)

*Primary Examiner* — Luis Perez-Fuentes
(74) *Attorney, Agent, or Firm* — Brinks Gilson & Lione

(57) ABSTRACT

Disclosed is a microscope device that includes: a sample placement unit on which a sample is set; an imaging unit configured to take an image of the sample that is set on the sample placement unit; a case in which the sample placement unit is provided and the imaging unit is disposed; a display unit configured to display the image taken by the imaging unit; and a moving unit, provided integrally with the display unit, configured to be movable relative to the sample placement unit.

18 Claims, 16 Drawing Sheets

(56) References Cited

U.S. PATENT DOCUMENTS

| 8,624,967 | B2* | 1/2014 | O'Connell | G02B 21/0008 348/79 |
|---|---|---|---|---|
| 2009/0046358 | A1 | 2/2009 | Shimada | |
| 2011/0085031 | A1 | 4/2011 | Park et al. | |
| 2011/0127406 | A1* | 6/2011 | Sase | G02B 21/245 250/201.3 |
| 2015/0054935 | A1* | 2/2015 | Muramatsu | G02B 21/24 348/79 |
| 2015/0185465 | A1* | 7/2015 | Karube | G02B 21/025 348/79 |
| 2015/0365625 | A1* | 12/2015 | Ishizaki | H04N 21/4312 348/581 |
| 2018/0074308 | A1* | 3/2018 | Okada | G02B 21/06 |
| 2018/0081157 | A1* | 3/2018 | Monk | G02B 21/0008 |

FOREIGN PATENT DOCUMENTS

| JP | H7-36118 U | 7/1995 |
|---|---|---|
| JP | 2006-71544 A | 3/2006 |
| JP | 2006-162771 A | 6/2006 |
| JP | 2010-102332 A | 5/2010 |
| JP | 2010-169736 A | 8/2010 |
| JP | 2011-085888 A | 4/2011 |
| JP | 2013-15665 A | 1/2013 |
| JP | 2015-084060 A | 4/2015 |
| WO | WO 97/21128 A1 | 6/1997 |
| WO | 2007/058223 A1 | 5/2007 |

OTHER PUBLICATIONS

Compact plane illumination plugin device to enable light sheet fluorescence microscope; Zeyi; 2015. (Year: 2015).*
NPL Internet search; 2019. (Year: 2019).*
Automated, portable, low-cost bright-field and fluorescence microscope; Schaefer; 2012. (Year: 2012).*
Compact plane illumination device to enable light sheet fluorescence microscope; Zeyi; 2015. (Year: 2015).*
Japanese Office Action dated Dec. 3, 2019 in a counterpart Japanese patent application No. 2016-177891.

* cited by examiner

FIG. 1A LIGHT-SHIELDING POSITION
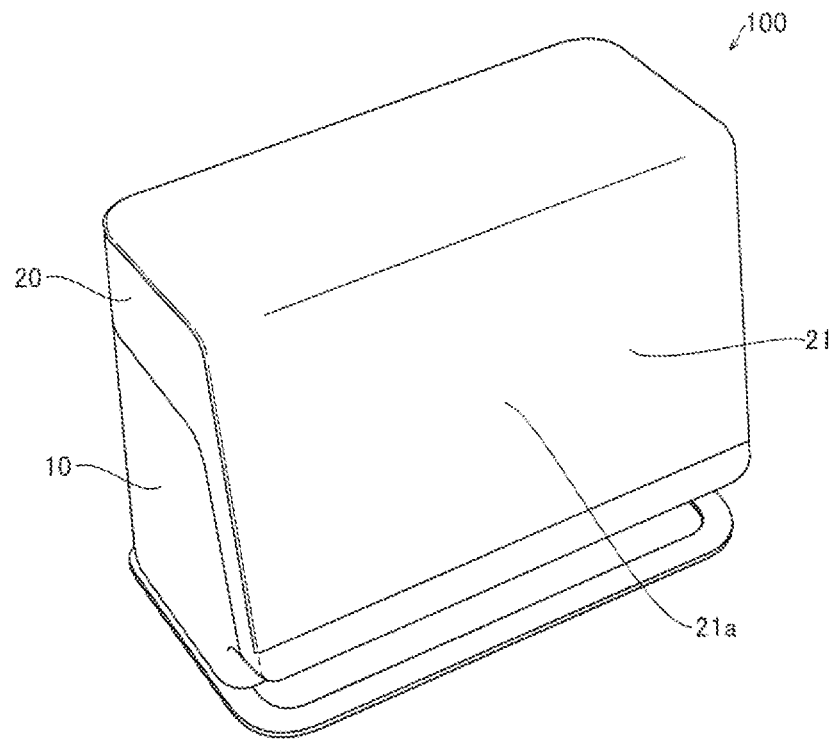
FIG. 1B OPENING POSITION
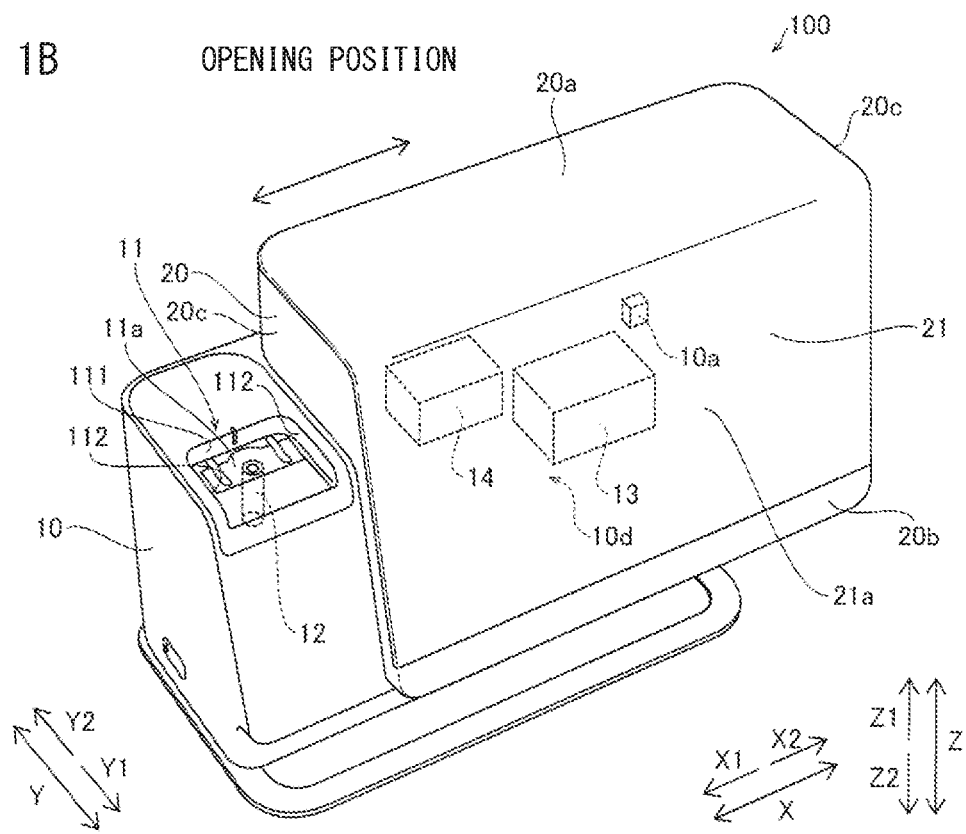

FIG. 13A  LIGHT-SHIELDING POSITION
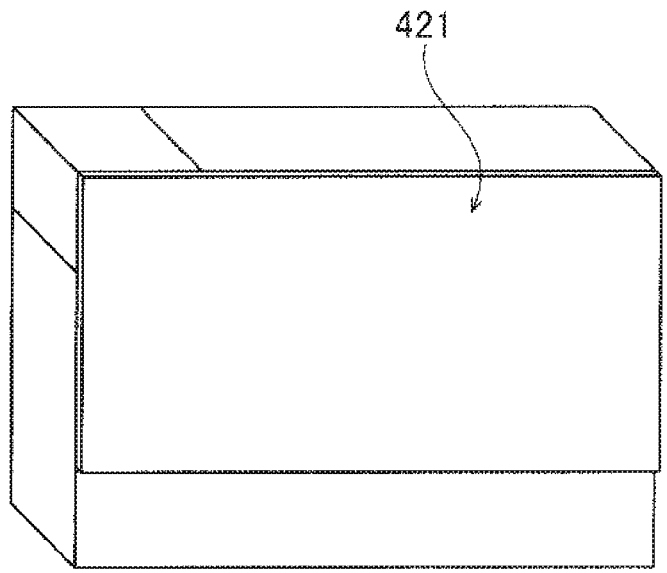
FIG. 13B  OPENING POSITION
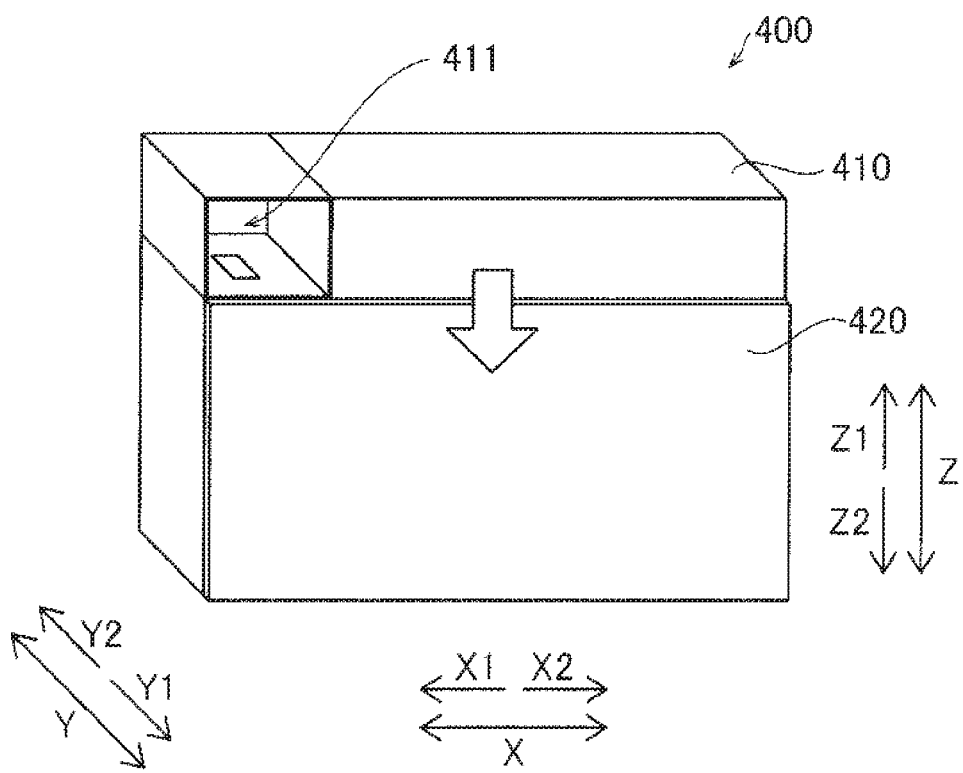

FIG. 14A    LIGHT-SHIELDING POSITION
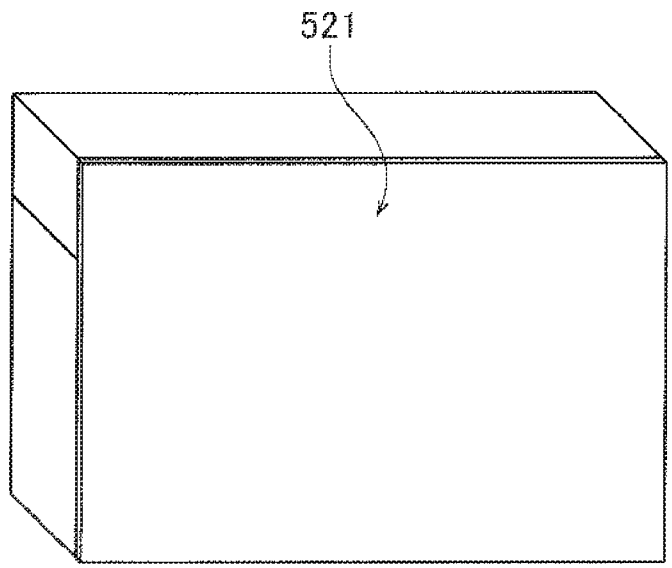
FIG. 14B    OPENING POSITION
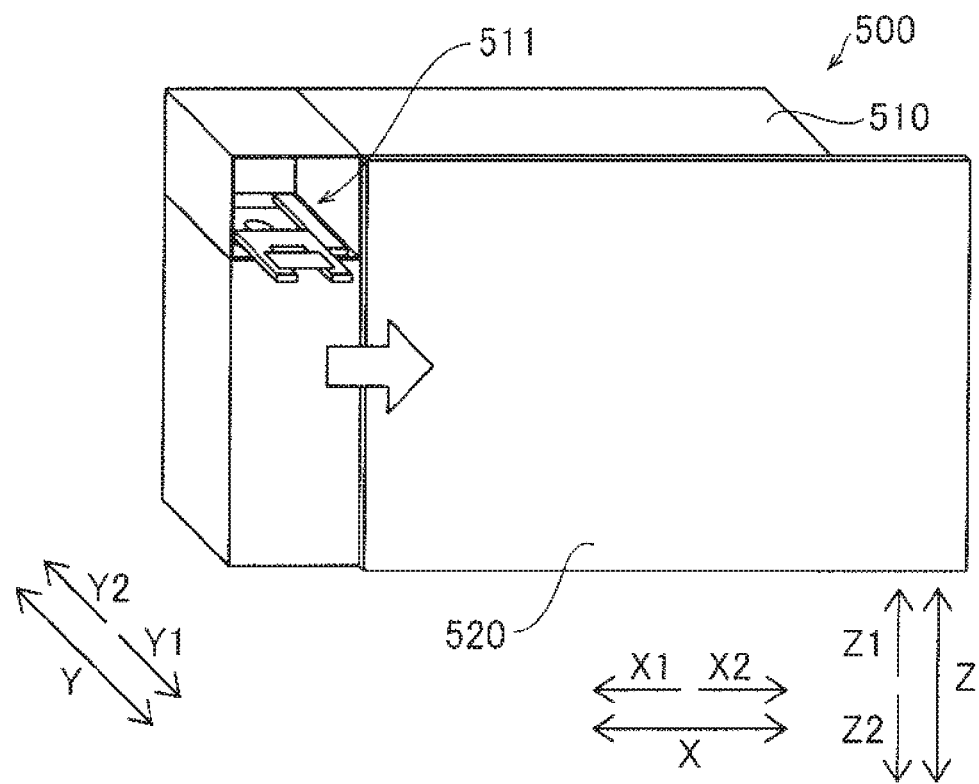

FIG. 15A    LIGHT-SHIELDING POSITION
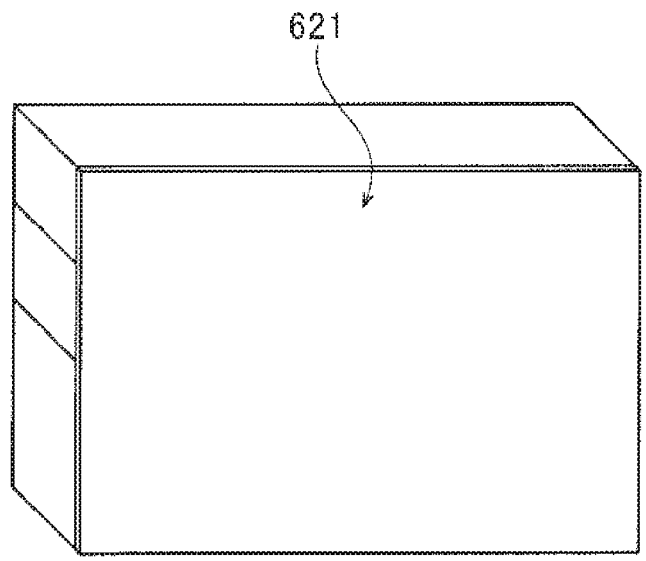
FIG. 15B    OPENING POSITION
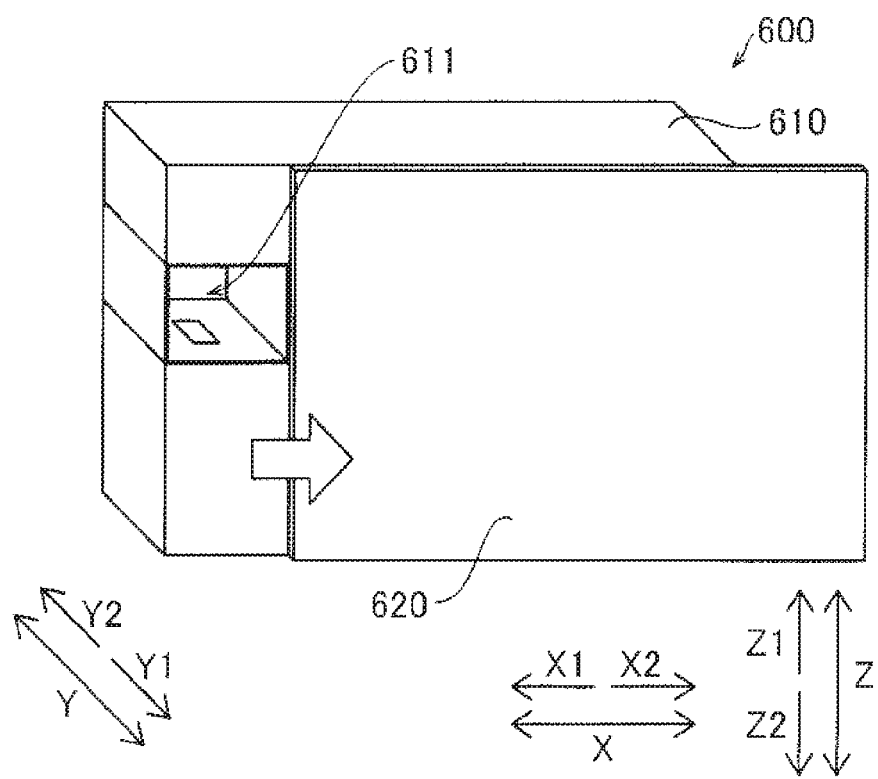

FIG. 17A  LIGHT-SHIELDING POSITION
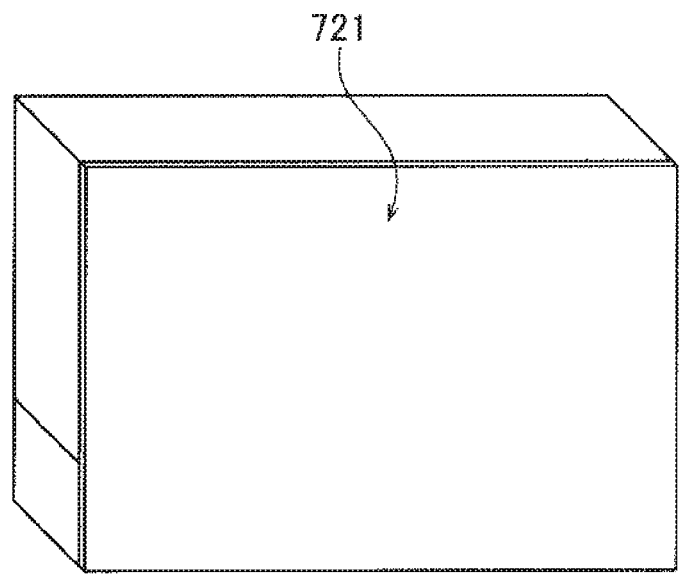
FIG. 17B  OPENING POSITION
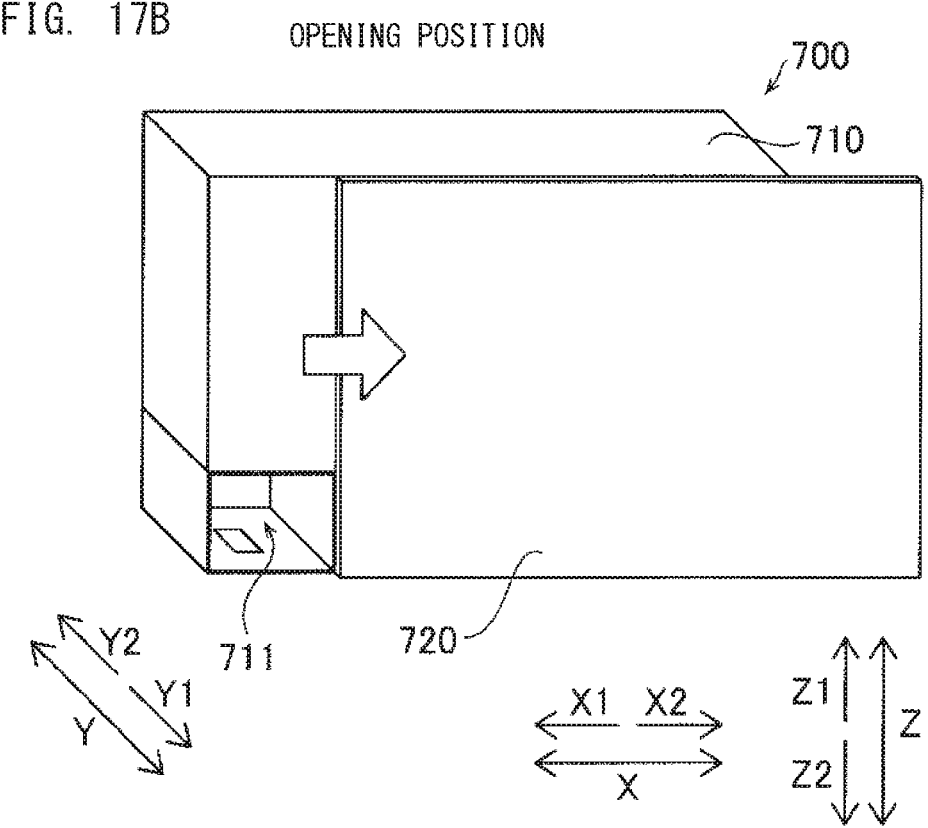

MICROSCOPE DEVICE, MICROSCOPE SYSTEM, AND IMAGING METHOD

RELATED APPLICATIONS

This application claims priority prior Japanese Patent Application No. 2016-177891, filed on Sep. 12, 2016, entitled "Microscope Device, Microscope System, and Imaging Method", the entire content of which is incorporated herein by reference.

BACKGROUND OF THE INVENTION

1. Field of the Invention

The present invention relates to a microscope device, a microscope system, and an imaging method.

2. Description of the Related Art

Japanese Laid-open Patent Publication No. 2015-084060 (hereinafter, referred to as Patent Literature 1) discloses, as shown in FIG. 24 and FIG. 25, a microscope device 800 that includes a stage frame 811 on which a stage 810 having a measurement target disposed thereon is set, an object lens 820 disposed so as to oppose the stage frame 811, a camera 840 that takes an image of the measurement target on the basis of light from an external light projector 830, and an upper lid 850 and a front lid 860 that cover the stage frame 811 to form a dark space. In the microscope device 800, an image of the measurement target which is taken by the camera 840 is displayed on an external display unit 870 that is provided separately from the microscope device 800.

In the microscope device 800 disclosed in Patent Literature 1, a taken image of a measurement target is displayed on the external display unit 870 that is provided separately from the microscope device 800, and, therefore, the display unit 870 needs to be separately installed. An installation area of the device is required to be further increased in order to enlarge a display region of the display unit 870. Therefore, a space in which the display unit 870 is installed needs to be assured in addition to a space in which the microscope device 800 is installed. Therefore, a problem arises that the installation area is increased.

SUMMARY OF THE INVENTION

The scope of the present invention is defined solely by the appended claims, and is not affected to any degree by the statements within this summary.

A microscope device 100 according to a first aspect of the present invention includes a sample placement unit 11 on which a sample is set, an imaging unit 10d configured to take an image of the sample that is set on the sample placement unit 11, a case 10 in which the sample placement unit 11 is provided and the imaging unit 10d is disposed, a display unit 21 configured to display the image taken by the imaging unit 10d, and a moving unit 20 provided integrally with the display unit 21 and configured to be movable relative to the sample placement unit 11.

The image taken by the imaging unit 10d includes, for example, a dark field image, a fluorescence image, and a bright field image.

A microscope system 300 according to a second aspect of the present invention is a microscope system 300 including a microscope device 100 and a control unit 200 programmed to control the microscope device 100. The microscope device 100 includes a sample placement unit 11 on which a sample is set, an imaging unit 10d configured to take an image of the sample that is set on the sample placement unit 11, a case 10 in which the sample placement unit 11 is provided and the imaging unit 10d is disposed, a display unit 21 configured to display the image taken by the imaging unit 10d, and a moving unit 20 provided integrally with the display unit 21 and configured to be movable relative to the sample placement unit 11.

An imaging method according to a third aspect of the present invention is an imaging method performed by a microscope device 100 having a display unit 21 integrated therewith. The imaging method includes moving the display unit 21 relative to a sample placement unit 11 of the microscope device 100 and opening the sample placement unit 11, moving the display unit 21 relative to the sample placement unit 11 and covering the sample placement unit 11 on which a sample is set, and taking, by the microscope device 100, an image of the sample that is set on the sample placement unit 11 in a state where the sample placement unit 11 is covered.

BRIEF DESCRIPTION OF THE DRAWINGS

FIG. 1A is a perspective view illustrating an example of a microscope device;

FIG. 1B is a perspective view illustrating an example of the microscope device;

FIG. 13A is a schematic perspective view of a configuration of a microscope device according to a first modification;

FIG. 13B is a schematic perspective view of a configuration of the microscope device according to the first modification;

FIG. 14A is a schematic perspective view of a configuration of a microscope device according to a second modification;

FIG. 14B is a schematic perspective view of a configuration of the microscope device according to the second modification;

FIG. 15A is a schematic perspective view of a configuration of a microscope device according to a third modification;

FIG. 15B is a schematic perspective view of a configuration of the microscope device according to the third modification;

FIG. 17A is a schematic perspective view of a configuration of a microscope device according to a fourth modification;

FIG. 17B is a schematic perspective view of a configuration of the microscope device according to the fourth modification;

DETAILED DESCRIPTION OF THE PREFERRED EMBODIMENTS

Figure 2:
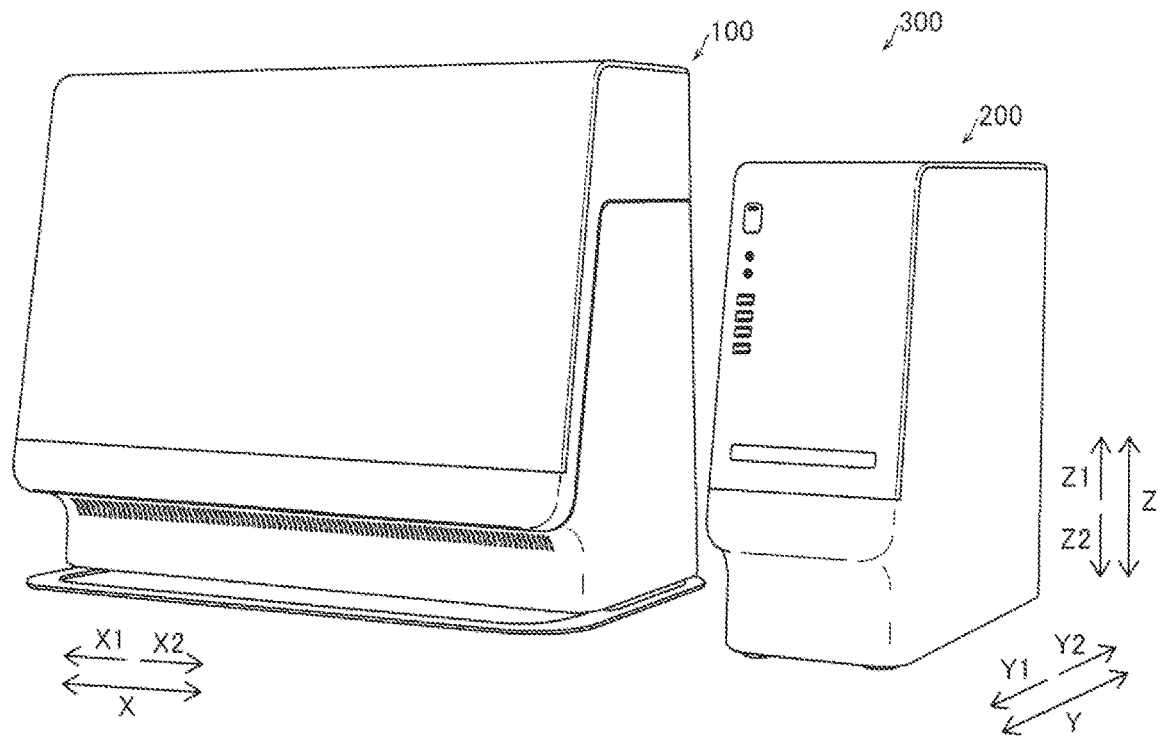
FIG. 2 is a perspective view illustrating an example of a microscope system.

Hereinafter, an embodiment will be described with reference to the drawings.

(Overall Configuration of Microscope Device)

A microscope device 100 according to the present embodiment will be schematically described with reference to FIG. 1A and FIG. 1B.

The microscope device 100 is a device for displaying, in an enlarged manner, a sample that is set on a sample placement unit 11. The sample is a biological sample, such as cells, collected from a subject (subject for experiment).

As shown in FIG. 1A and FIG. 1B, the microscope device 100 includes a case 10 and a moving unit 20. The microscope device 100 includes an imaging unit 10d and the sample placement unit 11. The imaging unit 10d includes an object lens 12, a light source 13, and an image pickup unit 14. The sample placement unit 11 is provided in the upper surface (surface on the side in the Z1 direction) of the case 10. The object lens 12, the light source 13, and the image pickup unit 14 are provided inside the case 10. The microscope device 100 includes a display unit 21. The display unit 21 is provided on the front surface (surface on the side in the Y1 direction) of the moving unit 20. A display surface 21a of the display unit 21 is disposed on the front surface side of the moving unit 20. The microscope device 100 includes a driving unit 10a that moves the moving unit 20 relative to the case 10.

In the following description, two directions that are orthogonal to each other in a plane (that is, horizontal plane) parallel to the surface on which the microscope device 100 is installed are referred to as an X direction and a Y direction. As shown in FIG. 1A and FIG. 1B, the microscope device 100 has an almost rectangular outer shape that is along the X direction and the Y direction in the planar view. The X direction is defined as the left-right direction of the microscope device 100, and the Y direction is defined as the front-rear direction of the microscope device 100. The Y1 direction represents the forward direction of the apparatus body, and the Y2 direction represents the rearward direction of the apparatus body. The up-down direction orthogonal to the horizontal plane is defined as a Z direction. The Z1 direction represents the upward direction and the Z2 direction represents the downward direction.

The moving unit 20 is movable, together with the display unit 21, relative to the case 10 to a light-shielding position (see FIG. 1A) at which the sample placement unit 11 is covered, and to an opening position (see FIG. 1B) at which the sample placement unit 11 is opened. Specifically, the moving unit 20 slides relative to the case 10 in the direction that is almost parallel to the installation surface of the case 10, whereby the moving unit 20 relatively moves to the light-shielding position and to the opening position. Thus, the moving unit 20 can be moved relative to the case 10 not in the up-down direction (Z direction) but in the lateral direction (X direction). Therefore, influence of the gravity is reduced, and the moving unit 20 can be easily moved relative to the case 10 to the light-shielding position or the opening position. The light-shielding position and the opening position can be arranged as parallel positions, whereby the display unit 21 provided in the moving unit 20 can be viewed also at the opening position at the same height as at the light-shielding position. Thus, viewability of the display unit 21 can be enhanced. In a state where the moving unit 20 has been moved relative to the case 10 to the opening position, a sample is set on the sample placement unit 11. In a state where the moving unit 20 has been moved relative to the case 10 to the light-shielding position, an image of the sample on the sample placement unit 11 is taken. The light-shielding position is an example of "first position" in claims, and the opening position is an example of "second position" in claims.

As shown in FIG. 1A and FIG. 1B, the moving unit 20 slides relative to the case 10 almost parallel to the installation surface of the case 10 in the longitudinal direction (X direction) of the case 10. Specifically, in a state where the case 10 is not moved relative to the installation surface, the moving unit 20 is moved relative to the case 10 and the installation surface. The moving unit 20 is movable relative to the case 10 in a direction that is almost parallel to the display surface 21a of the display unit 21. In other words, the moving unit 20 is movable relative to the case 10 in the direction (X direction) which is almost perpendicular to the side surfaces (side surfaces in the X1 direction and the X2 direction) that intersect the front surface of the case 10. Thus, unlike a case where the moving unit 20 is relatively moved in the front-rear direction (Y direction), of the case 10, which is perpendicular to the display surface 21a of the display unit 21, access from the front side toward the sample placement unit 11 in the case of the moving unit 20 having been moved to the opening position can be facilitated.

The moving unit 20 is moved relative to the case 10 by the driving unit 10a under a control from the outside. For example, the moving unit 20 is relatively moved to the light-shielding position and to the opening position by the driving unit 10a being driven on the basis of an operation performed by a user or a program. Thus, the moving unit 20 can be relatively moved easily to the light-shielding position and to the opening position. The driving unit 10a includes, for example, a motor and a belt pulley mechanism.

As shown in FIG. 1B, on the sample placement unit 11, a sample is set. The sample placement unit 11 is disposed in the upper surface (surface in the Z1 direction) of the case 10, which is almost parallel to the installation surface of the case 10. Thus, in a case where the moving unit 20 is relatively moved to the opening position, a portion above the sample placement unit 11 can be opened. Therefore, the sample placement unit 11 can be easily accessed.

The sample placement unit 11 is provided in the upper surface of the case 10 so as to be recessed such that a portion of the sample placement unit 11, except for the upper side portion and a portion on the side in one direction of the horizontal direction, is surrounded by a wall. For example, the sample placement unit 11 is provided in the upper surface of the case 10 so as to be recessed such that a portion thereof other than portions thereof on the front surface side and the upper side of the case 10 is surrounded by a wall. Specifically, the sample placement unit 11 includes a wall portion 111 disposed in the Y2 direction, and wall portions 112 disposed so as to oppose each other in the X direction. The sample placement unit 11 is surrounded by the wall portion 111 and the pair of wall portions 112 on the sides in the Y2 direction, the X1 direction, and the X2 direction. Thus, in a case where the moving unit 20 is at the light-shielding position, light can be inhibited from entering from the lateral side by both the moving unit 20 and the wall of a portion other than the front surface of the sample placement unit 11. The sample placement unit 11 is opened at the upper side and the side in one direction of the horizontal direction in a case where the moving unit 20 is at the opening position. For example, in a case where the moving unit 20 is at the opening position, the sample placement unit 11 is opened in the upper direction (Z1 direction) and the forward direction (Y1 direction). Thus, in a case where the moving unit 20 is at the opening position, the upper portion and the front portion are opened, whereby the sample placement unit 11 can be more easily accessed.

The sample placement unit 11 is disposed near the end portion of the case 10 in the direction in which the moving unit 20 is moved relative to the case 10. The sample placement unit 11 is disposed on the upper surface near the end portion of the case 10 in the X direction. As shown in FIG. 1B, the sample placement unit 11 is disposed near the end portion of the case 10 in the X1 direction. Thus, the moving unit 20 is moved relative to the case 10 over a length corresponding to the width of the sample placement unit 11, whereby the moving unit 20 can be moved to the opening position. Therefore, the size of the microscope device 100 can be inhibited from increasing when the moving unit 20 has been moved to the opening position.

The sample placement unit 11 includes a stage 11a. The stage 11a is movable in the horizontal direction (X direction and Y direction) and in the up-down direction (Z direction). The stage 11a can move independently in the X direction, the Y direction, and the Z direction. Thus, a sample can be moved relative to the object lens 12. Therefore, the sample at a desired position can be viewed in an enlarged manner.

As shown in FIG. 1B, the object lens 12 is disposed near the stage 11a of the sample placement unit 11. The object lens 12 is disposed near the lower portion (Z2 direction) of the stage 11a of the sample placement unit 11. The object lens 12 is disposed so as to oppose the sample placement unit 11 in the up-down direction (Z direction). The object lens 12 is disposed such that the optical axis is almost perpendicular to a sample setting surface of the sample placement unit 11 on which a sample is set. The object lens 12 is disposed so as to face upward. The object lens 12 is movable relative to the sample placement unit 11 in the up-down direction (Z direction). The object lens 12 is disposed such that its longitudinal direction is the up-down direction. That is, the object lens 12 is disposed so as to have the optical axis in almost the vertical direction. The object lens 12 includes a plurality of lenses. The object lens 12 allows the sample to be enlarged at a predetermined magnification when viewed. The object lens 12 includes an immersion lens. That is, the object lens 12 is used by oil such as silicone oil or liquid such as water being dropped. The object lens 12 may not be an immersion lens, and may be used without dropping liquid onto the object lens 12.

As shown in FIG. 1B, the light source 13 can apply light to a sample. The light source 13 applies light to a sample through the object lens 12. The light source 13 applies light to a sample from the same side as the image pickup unit 14 side. The light source 13 can output light having a predetermined wavelength. The light source 13 can output lights having a plurality of different wavelengths. That is, the light source 13 can output different kinds of lights. The light source 13 includes a light emitting element. The light emitting element includes, for example, a LED element or a laser element.

As shown in FIG. 1B, the image pickup unit 14 can take an image of a sample on the basis of light applied by the light source 13. Specifically, the image pickup unit 14 can take a still image or a moving image of the sample on the basis of light which is generated from the sample by the light applied by the light source 13. The image pickup unit 14 includes an image pickup element. The image pickup element includes, for example, a CCD element or a CMOS element. The image pickup unit 14 is capable of performing high sensitivity imaging. That is, the image pickup unit 14 is capable of taking an image on the basis of low light. The image pickup unit 14 may take an image of a sample on the basis of light from a light source (not shown) provided on a side (side in the Z1 direction) opposite to the object lens 12 side across the sample placement unit 11. That is, the image pickup unit 14 may take an image of a sample on the basis of light that is applied from the rear side of the sample and that transmits through the sample.

As shown in FIG. 1A and FIG. 1B, the display unit 21 is capable of displaying an image taken by the image pickup unit 14. The display unit 21 is provided integrally with the moving unit 20. The display unit 21 is capable of displaying a screen for operating the microscope device 100. The display unit 21 is capable of displaying a screen based on a program for taking an image of a sample. The display unit 21 is capable of displaying a screen representing a state of the microscope device 100. The display unit 21 is capable of displaying a screen based on a signal from an external controller. The display unit 21 is disposed on a side of the moving unit 20 in one direction of the horizontal direction. For example, the display unit 21 is disposed on the front side (the side in the Y1 direction) of the moving unit 20.

As shown in FIG. 1B, the moving unit 20 includes a horizontal surface 20a, an intersecting surface 20b, and a pair of side surfaces 20c disposed so as to oppose each other in the X direction. The horizontal surface 20a extends in the direction (XY direction) that is almost parallel to the installation surface of the case 10, and covers the sample placement unit 11 of the case 10 from thereabove. The intersecting surface 20b is connected to the horizontal surface 20a, extends in the direction that intersects the horizontal surface 20a, and covers the sample placement unit 11 of the case 10 from a side in one direction that is almost parallel to the installation surface. Specifically, the intersecting surface 20b is structured so as to cover the sample placement unit 11 of the case 10 from the front thereof. Thus, in a case where the moving unit 20 has been relatively moved to the opening position, the upper and the front portions of the sample placement unit 11 can be opened. Therefore, the sample placement unit 11 can be easily accessed. As a result, an operation on the sample placement unit 11 can be facilitated. By the display unit 21 being disposed on the intersecting surface 20b, the display unit 21 can be disposed on the front surface, thereby allowing viewability of the display unit 21 to be improved. The side surfaces 20c are connected to the lower portions of the horizontal surface 20a on both ends thereof in the X direction. The side surfaces 20c are formed so as to extend in the vertical direction. The side surfaces 20c are structured so as to cover the sample placement unit 11 of the case 10 from the sides in the X direction. The moving unit 20 is formed into almost an inverted L-shape by the horizontal surface 20a and the intersecting surface 20b. On the intersecting surface 20b, the display unit 21 is disposed.

As shown in FIGS. 1A and 1B, in a case where the moving unit 20 is at the light-shielding position, almost the entirety of the case 10 is covered, in the direction that is almost parallel to the installation surface of the case 10 and in the longitudinal direction of the case 10, by the display unit 21 disposed on the intersecting surface 20b of the moving unit 20. The display unit 21 is disposed over almost the entirety of the intersecting surface 20b. The intersecting surface 20b is structured so as to cover almost the entirety of the front surface of the case 10 in a case where the moving unit 20 is at the light-shielding position. The display unit 21 is disposed, over almost the entirety of the intersecting surface 20b of the moving unit 20, in the lateral direction (X direction) of the screen. The display unit 21 is disposed, over almost the entirety of the intersecting surface 20b of the moving unit 20, in the up-down direction (along the Z direction) of the screen. Thus, the display unit 21 can be disposed in such a range as to cover almost the entirety, in the longitudinal direction (X direction), of the front surface of the case 10. Therefore, the display unit 21 can be enlarged. As a result, displayed contents can be easily viewed.

The display unit 21 is disposed so as to have a predetermined tilt relative to the direction (Z direction) perpendicular to the installation surface of the case 10. In other words, the intersecting surface 20b of the moving unit 20 is disposed so as to have a predetermined tilt relative to the direction (Z direction) perpendicular to the installation surface. For example, the display unit 21 is disposed so as to be tilted, by about one degree to about 30 degrees, relative to the direction perpendicular to the installation surface. The display unit 21 is disposed such that the lower end (end in the Z2 direction) is disposed forward (Y1 direction) of the upper end (end in the Z1 direction). Thus, as compared to a case where the display unit 21 is disposed along the direction perpendicular to the installation surface, the display unit 21 can be more easily viewed. The portion of the moving unit 20 in which the display unit 21 is disposed has almost the same tilt as the predetermined tilt.

The front surface (surface in the Y1 direction) of the case 10 has almost the same tilt as the predetermined tilt of the intersecting surface 20b. The surface of the case 10 which opposes the portion of the moving unit 20, which has almost the same tilt as the predetermined tilt, has almost the same tilt as the predetermined tilt. The front surface of the case 10 and the display unit 21 are almost parallel to each other. Thus, the tilt of the front surface of the case 10 can be made almost the same as the tilt of the display unit 21. Therefore, the thickness of the moving unit 20 on which the display unit 21 is disposed can be made almost constant. As a result, the thickness of a portion of the moving unit 20 on which the display unit 21 is disposed can be inhibited from being increased. Therefore, the moving unit 20 can be inhibited from being enlarged. Thus, the driving unit 10a for moving the moving unit 20 can be inhibited from being enlarged.

Thus, the moving unit 20 is provided which is movable relative to the case 10 to the light-shielding position at which the sample placement unit 11 is shielded from external light, and to the opening position at which the sample placement unit 11 is opened. Therefore, the sample placement unit 11 can be shielded from light when an image is taken. Thus, the microscope device 100 can be installed and used at a bright place such as a clinical laboratory or a pathology laboratory without disposing the microscope device 100 in a dark space. By the display unit 21 being integrated with the moving unit 20, the display unit need not be separately provided and installed in addition to the microscope device 100. Therefore, the installation area can be reduced. In a case where the moving unit 20 that is integrated with the display unit 21 is relatively moved to the light-shielding position and to the opening position when the moving unit 20 is moved to the opening position, the display unit 21 as well as the moving unit 20 can be moved so as not to interfere with access to the sample placement unit 11. Thus, an operation for, for example, placing a sample on the sample placement unit 11 can be easily performed. In a case where the moving unit 20 has been moved to the opening position, the display unit 21 does not interfere with access to the sample placement unit 11, whereby the size of the display unit 21 can be maximized. Thus, a sample displayed in an enlarged manner can be checked in detail.

(Example of Structure of Microscope System)

Next, a specific example of the structure of a microscope system 300 will be described with reference to FIG. 2.

As shown in FIG. 2, the microscope system 300 includes the microscope device 100 and a control unit 200. The microscope device 100 and the control unit 200 are connected such that the microscope device 100 and the control unit 200 can mutually transmit and receive signals. For example, the microscope device 100 and the control unit 200 are connected such that the microscope device 100 and the control unit 200 can perform wired or wireless communication with each other.

The control unit 200 is configured so as to control the microscope device 100. The control unit 200 is configured as, for example, a computer, and includes a CPU (central processing unit), a memory, and the like. The control unit 200 controls a process of taking an image of a sample by the microscope device 100. The control unit 200 controls moving of the moving unit 20 of the microscope device 100 to the light-shielding position and to the opening position. The control unit 200 controls the microscope device 100 on the basis of a program. The control unit 200 is capable of performing image processing of an image obtained by an image of a sample taken by the microscope device 100 being enlarged. The control unit 200 is capable of outputting the processed image to the microscope device 100, and causing the display unit 21 of the microscope device 100 to display the image. The control unit 200 is capable of causing the display unit 21 of the microscope device 100 to display an image based on the program.

(Example of Configuration of Optical System)

Next, an example of a configuration of an optical system of the microscope device 100 will be described with reference to FIG. 3 and FIG. 4.

Figure 3:
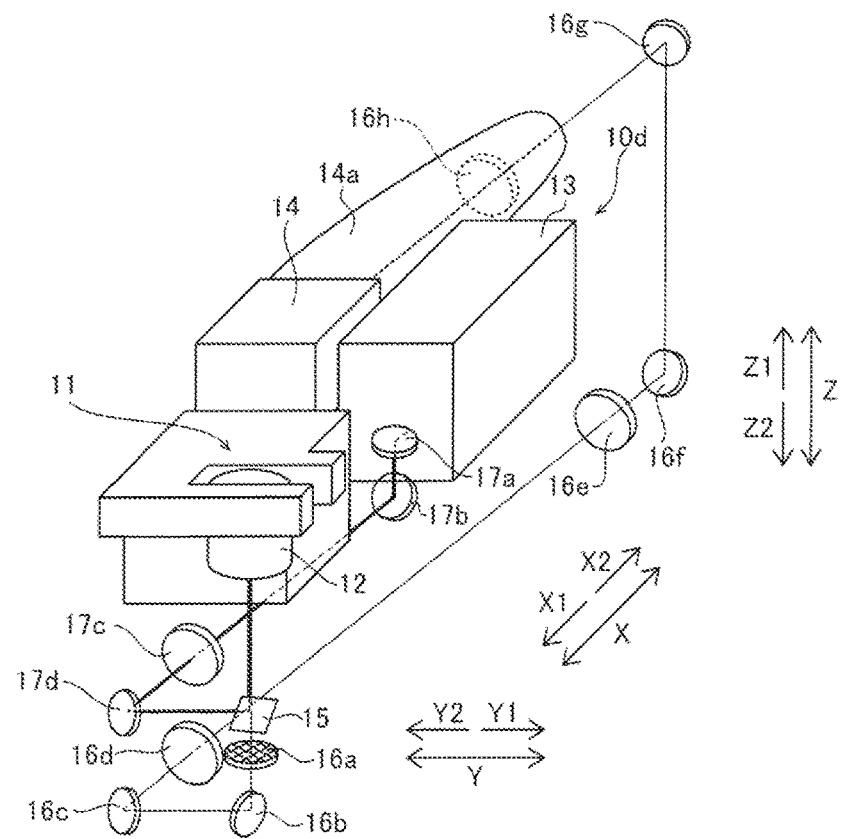
FIG. 3 is a schematic perspective view illustrating an example of an internal structure of the microscope device.

As shown in FIG. 3, the microscope device 100 includes, as a configuration of the optical system, the object lens 12, the light source 13, the image pickup unit 14, a first optical element 15, a filter 16a, second optical elements 16b, 16c, 16f, and 16g, lenses 16d, 16e, and 16h, reflectors 17a, 17b, and 17d, and a lens 17c. The object lens 12, the light source 13, the image pickup unit 14, the first optical element 15, the filter 16a, the second optical elements 16b, 16c, 16f, and 16g, the lenses 16d, 16e, and 16h, the reflectors 17a, 17b, and 17d, and the lens 17c are disposed inside the case 10.

The first optical element 15 reflects light from the light source 13 in an optical axis direction of the object lens 12, and transmits light from a sample therethrough. The first optical element 15 includes, for example, a dichroic mirror. That is, the first optical element 15 reflects light having a wavelength of light from the light source 13, and transmits therethrough light having a wavelength of light generated from a sample.

The filter 16a transmits therethrough light having a predetermined wavelength and blocks light having the other wavelengths, or blocks light having a predetermined wavelength and transmits therethrough light having the other wavelengths. That is, the filter 16a allows light having a desired wavelength to be transmitted therethrough and to reach the image pickup unit 14.

The second optical elements 16b, 16c, 16f, and 16g reflect light from a sample toward the image pickup unit 14. The second optical elements 16b, 16c, 16f, and 16g include reflectors. The second optical elements 16b, 16c, 16f, and 16g include, for example, mirrors.

The reflectors 17a, 17b, and 17d reflect light from the light source 13 toward the object lens 12. The reflectors 17a, 17b, and 17d include, for example, mirrors.

Light emitted from the light source 13 is reflected by the reflector 17a and incident on the reflector 17b. The light incident on the reflector 17b is reflected and incident on the reflector 17d through the lens 17c. The light incident on the reflector 17d is reflected and incident on the first optical element 15. The light incident on the first optical element 15 is reflected and reaches the sample placement unit 11 through the object lens 12, and is applied to a sample.

Light generated from the sample on the basis of the light from the light source 13 is incident on the first optical element 15 through the object lens 12. The light incident on the first optical element 15 is transmitted therethrough, and incident on the second optical element 16b through the filter 16a. The light incident on the second optical element 16b is reflected and incident on the second optical element 16c. The light incident on the second optical element 16c is reflected, and incident on the second optical element 16f through the lenses 16d and 16e. The light incident on the second optical element 16f is reflected and incident on the second optical element 16g. The light incident on the second optical element 16g is reflected and reaches the image pickup unit 14 through the lens 16h. The image pickup unit 14 takes an image of the sample as an enlarged image on the basis of the light that has reached.

The light source 13 is disposed at such a position that light from the light source 13 travels in almost the vertical direction (Z direction) by the light traveling direction being changed at least once, and is incident on the object lens 12. That is, the light source 13 is disposed so as to be offset relative to the optical axis of the object lens 12. Thus, the light source 13 need not be provided on the extension of the object lens 12 in the optical axis direction in a case where the object lens 12 is disposed in almost the vertical direction. Therefore, the size of the microscope device 100 in the up-down direction can be inhibited from being increased.

The image pickup unit 14 is disposed at such a position that light from a sample is incident on the image pickup unit 14 by the direction of the light being changed at least once from the direction that is almost parallel to the optical axis of the object lens 12. That is, the image pickup unit 14 is disposed so as to be offset relative to the optical axis of the object lens 12. Thus, the image pickup unit 14 need not be provided on the extension of light from a sample in the optical axis direction. Therefore, the size of the microscope device 100 in the up-down direction can be inhibited from being increased.

As shown in FIG. 3, the microscope device 100 includes an imaging cover 14a that blocks external light in a region in the direction in which light to be image-taken by the image pickup unit 14 is incident. The imaging cover 14a is disposed so as to surround the optical axis on the side on which light is incident on the image pickup unit 14. That is, light incident on the image pickup unit 14 is only light, of lights generated from the sample, which reaches through the optical system. The imaging cover 14a is formed from, for example, a light-shielding cloth or sheet. For example, the imaging cover 14a is formed from a black cloth. Thus, external light can be doubly blocked by the imaging cover 14a and the case 10. Thus, the image pickup unit 14 can accurately take an image.

Figure 4:
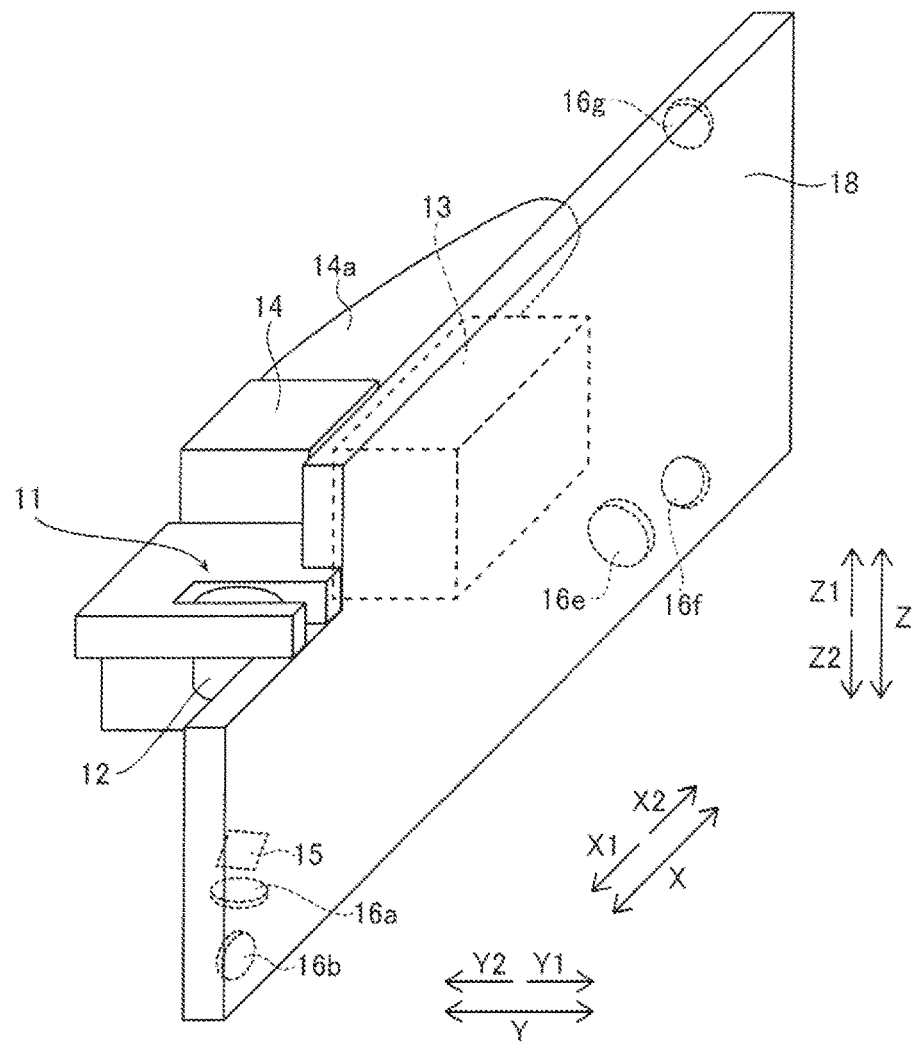
FIG. 4 is a schematic perspective view illustrating an example of a base plate disposed inside the microscope device.
Figure 5:
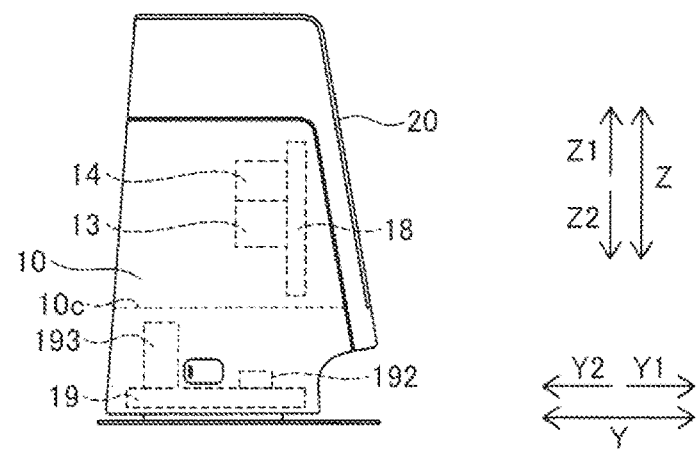
FIG. 5 is a side view illustrating an example of the microscope device.

As shown in FIG. 4, the microscope device 100 includes a base plate 18 which is disposed inside the case 10, and on which the object lens 12 disposed such that its optical axis is almost perpendicular to the sample placement unit 11, the light source 13, and the image pickup unit 14 are disposed. The base plate 18 is disposed so as to be almost perpendicular to the installation surface of the case 10 (see FIG. 5). The base plate 18 is disposed so as to be almost parallel to the optical axis of the object lens 12. Specifically, the base plate 18 is disposed so as to extend along the XZ-plane. Thus, the object lens 12, the light source 13, and the image pickup unit 14 can be disposed on the common base plate 18. Therefore, positional relationship between the components of the optical system can be inhibited from being changed.

The first optical element 15 and the second optical elements 16b, 16c, 16f, and 16g are disposed on the base plate 18. Thus, the light source 13, the first optical element 15, and the second optical elements 16b, 16c, 16f, and 16g can be disposed on the common base plate 18. Therefore, relative positional relationship between the light source 13, the first optical element 15, and the second optical elements 16b, 16c, 16f, and 16g can be inhibited from being changed.

(Example of Structure of Connection Between Case and Moving Unit)

Next, an example of a structure of connection between the case 10 and the moving unit 20 of the microscope device 100 will be described with reference to FIG. 6 to FIG. 9.

Figure 6:
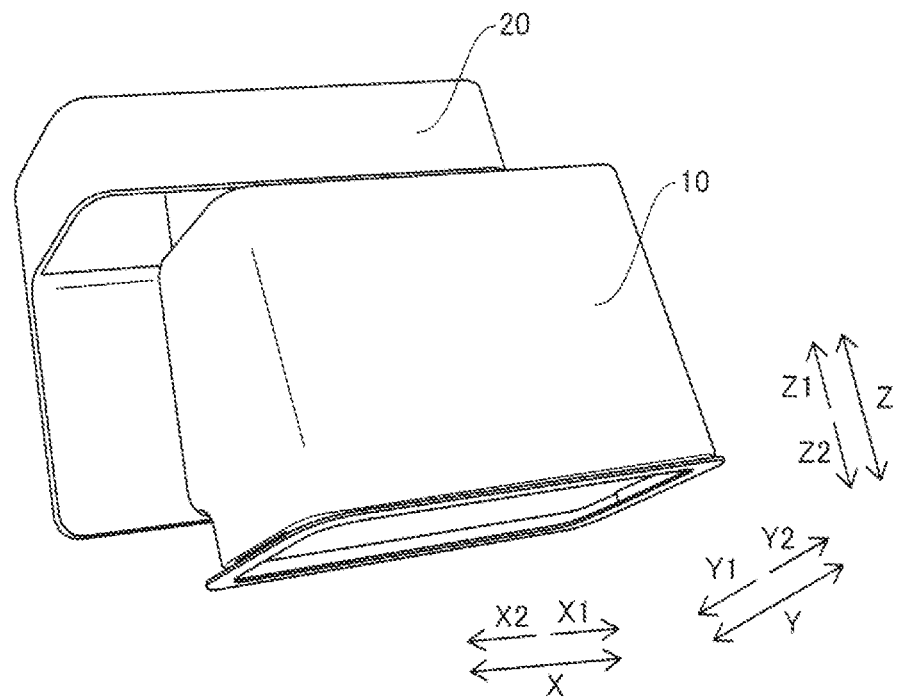
FIG. 6 is a perspective view illustrating an example of the microscope device as viewed from the rear surface thereof.
Figure 7:
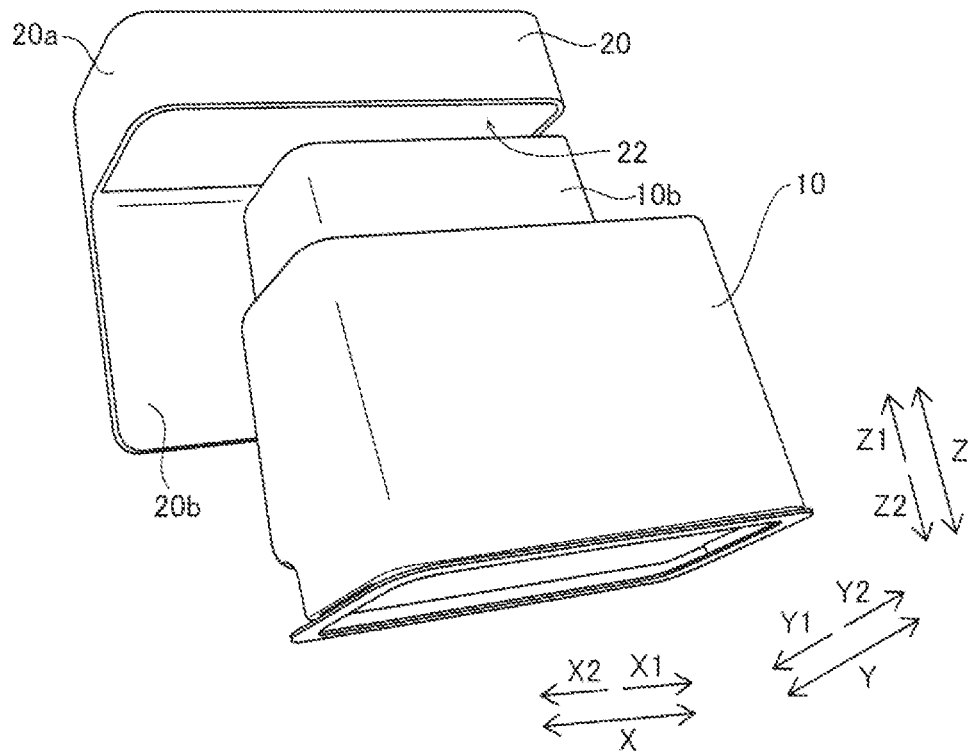
FIG. 7 is a perspective view illustrating a state where a case of the microscope device and a moving unit thereof are separated from each other.

As shown in FIG. 6 and FIG. 7, the case 10 includes an engaging portion 10b that projects upward (in the Z1 direction). The moving unit 20 includes a recess 22 that engages with the engaging portion 10b of the case 10. The recess 22 is formed so as to be recessed in the up-down direction. The recess 22 is formed so as to extend in the X direction. As shown in FIG. 6, the recess 22 of the moving unit 20 engages with the engaging portion 10b of the case 10. Thus, the moving unit 20 is connected so as to be movable relative to the case 10 in the X direction.

Figure 8:
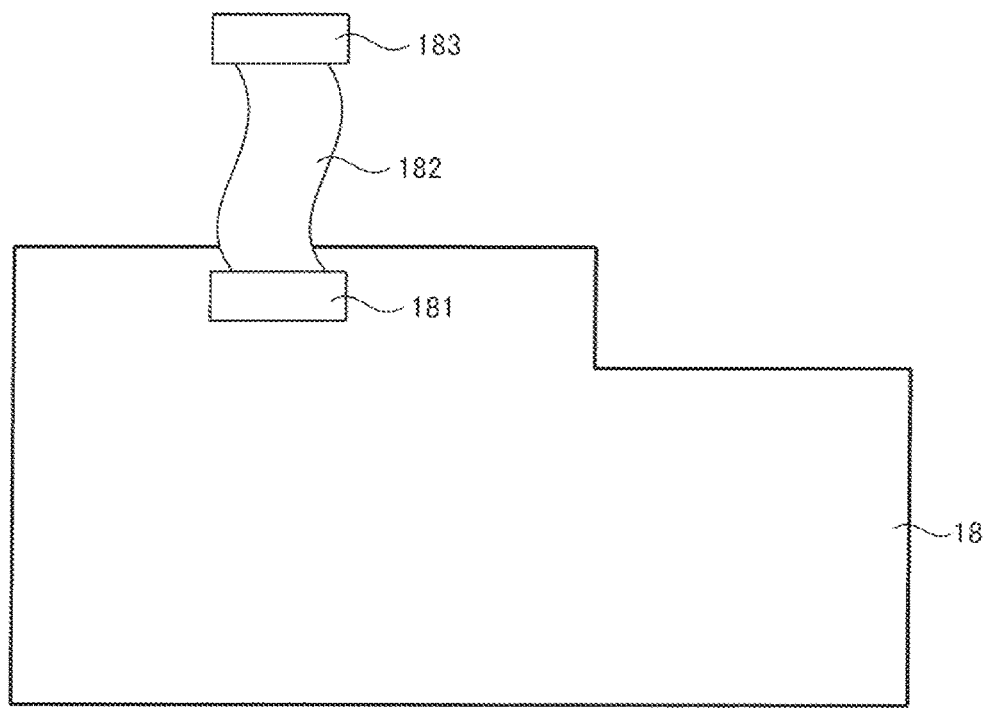
FIG. 8 illustrates a connection of the base plate of the microscope device.

As shown in FIG. 8, the base plate 18 disposed inside the case 10 includes a connection terminal 181, a flex cable 182, and a connection terminal 183. The connection terminal 181 can be connected to the base plate 18. By the flex cable 182, the connection terminal 181 and the connection terminal 183 are connected with each other. The connection terminal 183 can be connected to a base plate provided in the moving unit 20.

Figure 9:
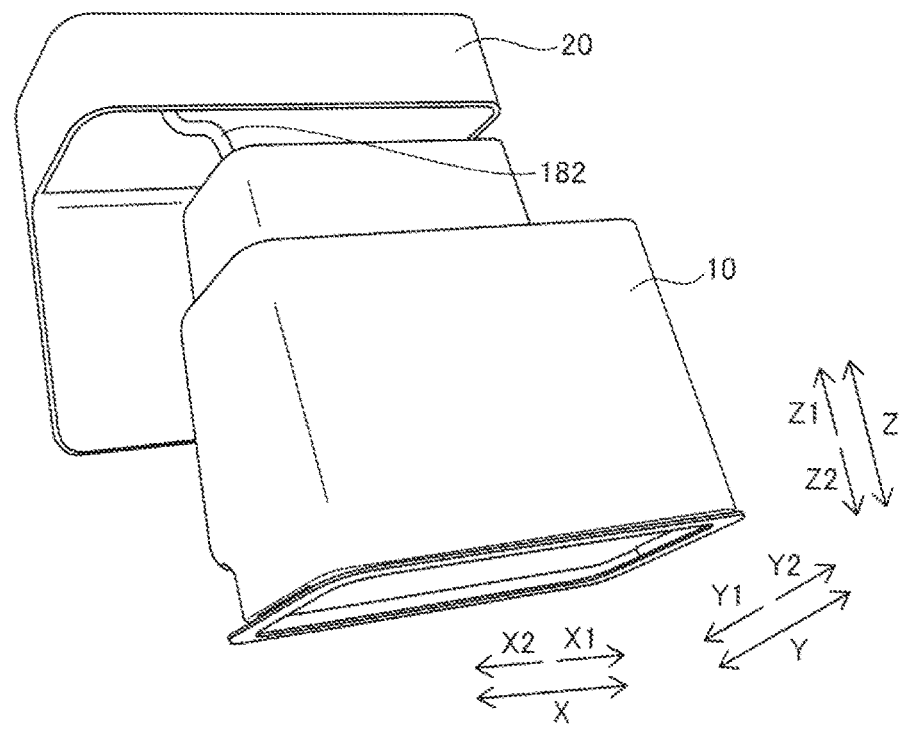
FIG. 9 illustrates connection between the case and the moving unit of the microscope device.

As shown in FIG. 9, the display unit 21 is electrically connected to the case 10 so as to be movable relative to the case 10. Thus, power can be supplied to the display unit 21 that moves, together with the moving unit 20, relative to the case 10, and the display unit 21, can be caused to transmit and receive electrical signals.

(Examples of Configurations of Controller and Fan)

Next, examples of configurations of a controller 192 and fans 193 of the microscope device 100 will be described with reference to FIG. 10 to FIG. 12.

Figure 10:
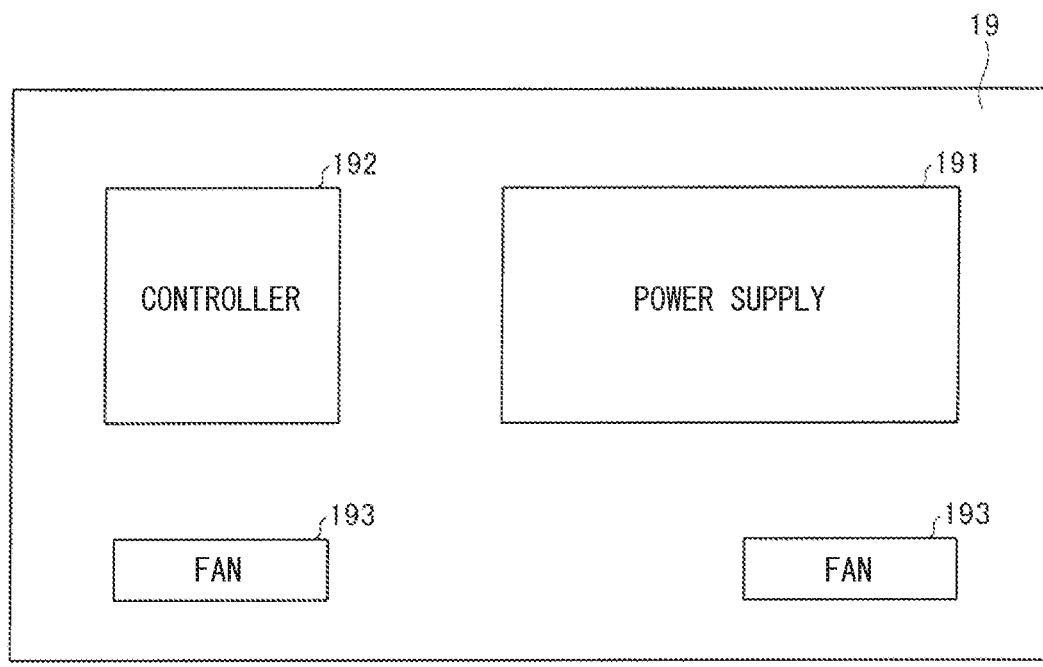
FIG. 10 schematically illustrates an example of a base plate having fans disposed in the microscope device.

As shown in FIG. 10, the microscope device 100 includes a base plate 19. On the base plate 19, a power supply 191, the controller 192, and a plurality of the fans 193 are provided. The base plate 19 is disposed at the lower portion (see FIG. 5) of the case 10 inside the case 10. The base plate 19 is horizontally disposed. Power is supplied to the power supply 191 from the outside. The power supply 191 supplies the supplied power to the components of the microscope device 100. For example, the power supply 191 supplies power to the light source 13, the image pickup unit 14, the display unit 21, the driving unit 10a, the controller 192, the fans 193, and the like.

The controller 192 controls the components of the microscope device 100. For example, the controller 192 controls application of light by the light source 13. The controller 192 controls driving by the driving unit 10a. The controller 192 controls the components of the microscope device 100 on the basis of control by the control unit 200. The controller 192 is disposed inside the case 10 in a region (see FIG. 5) that is partitioned from a region in which the object lens 12, the light source 13, and the image pickup unit 14 are disposed. Specifically, the controller 192 is partitioned by a partition member 10c. The base plate 18 is disposed above the partition member 10c. The base plate 19 is disposed below the partition member 10c. Thus, the controller 192 is disposed so as to separate from the object lens 12, the light source 13, and the image pickup unit 14, whereby heat from the controller 192 can be inhibited from being transmitted to the object lens 12, the light source 13, and the image pickup unit 14. A member for partitioning the region in which the controller 192 is disposed allows light-shielding properties of the object lens 12, the light source 13, and the image pickup unit 14 to be enhanced.

Figure 11:
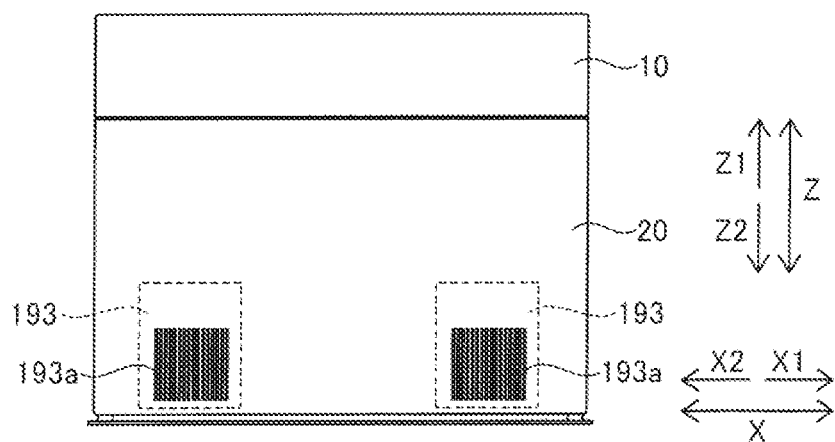
FIG. 11 is a rear view of an example of the microscope device.

As shown in FIG. 10 and FIG. 11, the fans 193 are structured so as to cool the inside of the case 10. Specifically, when the fans 193 are driven, the fans 193 take in air into the case 10 from the outside, circulate the air, and exhaust the air through air exits 193a. A pair of the fans 193 are disposed along the X direction. The fans 193 are disposed at the lower side (side in the Z2 direction) on the rear surface side (side in the Y2 direction) of the case 10. Operations of the fans 193 are halted while the image pickup unit 14 is taking an image of a sample. Thus, vibration of the fans 193 can be prevented from being transmitted to the image pickup unit 14, the sample placement unit 11, and the like while an image is being taken. Therefore, an image of the sample can be accurately taken.

Figure 12:
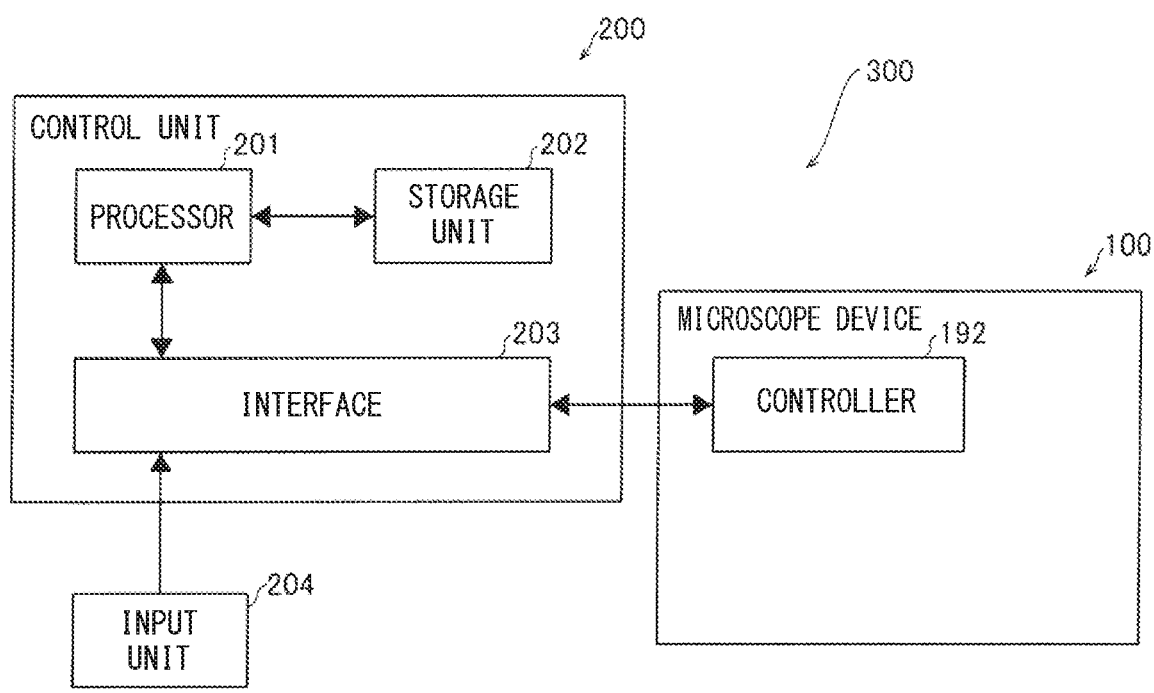
FIG. 12 is a block diagram illustrating an example of a control configuration of the microscope system.

As shown in FIG. 12, the controller 192 is connected to the control unit 200. The control unit 200 includes a processor 201, a storage unit 202, and an interface 203. To the control unit 200, an input unit 204 is connected. The controller 192 is connected to the processor 201 through the interface 203. The processor 201 includes, for example, a CPU, and controls operation of the microscope device 100. The storage unit 202 includes, for example, a HDD (hard disk drive), an SSD (solid-state drive), and the like. In the storage unit 202, a program executed by the control unit 200, and information are stored. The input unit 204 receives an operation performed by a user. The input unit 204 includes, for example, a mouse or a keyboard. The input unit 204 is connected to the processor 201 through the interface 203.

(Structure of Microscope Device According to First Modification)

Next, a structure of a microscope device 400 according to a first modification will be described with reference to FIG. 13A and FIG. 13B.

As shown in FIG. 13B, the microscope device 400 includes a case 410 and a moving unit 420. In the case 410, a sample placement unit 411 is provided. The moving unit 420 has a display unit 421 integrated therewith. As shown in FIG. 13B, the moving unit 420 is disposed on the front surface side (side in the Y1 direction) of the case 410. The moving unit 420 has a flat plate shape that extends along the plane (XZ-plane) perpendicular to the installation surface of the case 410.

The moving unit 420 slides along the up-down direction (Z direction), to be movable to the light-shielding position and to the opening position. The direction in which the moving unit 420 moves is almost parallel to the surface direction in which the display unit 421 extends. That is, in a case where the display unit 421 is disposed so as to be titled by a predetermined angle relative to the up-down direction (Z direction), the direction in which the moving unit 420 moves is also diagonal relative to the up-down direction (Z direction) by the predetermined angle. As shown in FIG. 13B, in a case where the moving unit 420 is at the opening position, the sample placement unit 411 is opened at the front side (side in the Y1 direction). The sample placement unit 411 is disposed on the side, in the X1 direction, of the case 410. The sample placement unit 411 is disposed on the upper side (side in the Z1 direction) of the case 410 in the up-down direction (Z direction)

(Structure of Microscope Device According to Second Modification)

Next, a structure of a microscope device 500 according to a second modification will be described with reference to FIG. 14A and FIG. 14B.

As shown in FIG. 14B, the microscope device 500 includes a case 510 and a moving unit 520. In the case 510, a sample placement unit 511 is provided. The moving unit 520 has a display unit 521 integrated therewith. As shown in FIG. 14B, the moving unit 520 is disposed on the front surface side (side in the Y1 direction) of the case 510. The moving unit 520 has a flat plate shape that extends along the plane (XZ-plane) perpendicular to the installation surface of the case 510.

The moving unit 520 slides along the horizontal direction (X direction), to be movable to the light-shielding position and to the opening position. As shown in FIG. 14B, in a case where the moving unit 520 is at the opening position, the sample placement unit 511 is opened at the front side (side in the Y1 direction). The sample placement unit 511 is movable in the forward direction (Y1 direction). Thus, by the sample placement unit 511 being moved forward, the upper portion (in the Z1 direction) of the sample placement unit 511 is also opened. The sample placement unit 511 is disposed on the side in the X1 direction of the case 510. The sample placement unit 511 is disposed on the upper side (side in the Z1 direction) of the case 510 in the up-down direction (Z direction).

(Structure of Microscope Device According to Third Modification)

Next, a structure of a microscope device 600 according to a third modification will be described with reference to FIG. 15A, FIG. 15B, and FIG. 16.

As shown in FIG. 15B, the microscope device 600 includes a case 610 and a moving unit 620. In the case 610, a sample placement unit 611 is provided. The moving unit 620 has a display unit 621 integrated therewith. As shown in FIG. 15B, the moving unit 620 is disposed on the front surface side (side in the Y1 direction) of the case 610. The moving unit 620 has a flat plate shape that extends along the plane (XZ-plane) perpendicular to the installation surface of the case 610.

The moving unit 620 slides along the horizontal direction (X direction) to be movable to the light-shielding position and to the opening position. As shown in FIG. 15B, in a case where the moving unit 620 is at the opening position, the sample placement unit 611 is opened at the front side (side in the Y1 direction). The sample placement unit 611 is disposed on the side in the X1 direction of the case 610. The sample placement unit 611 is disposed near the center of the case 610 in the up-down direction (Z direction).

Figure 16:
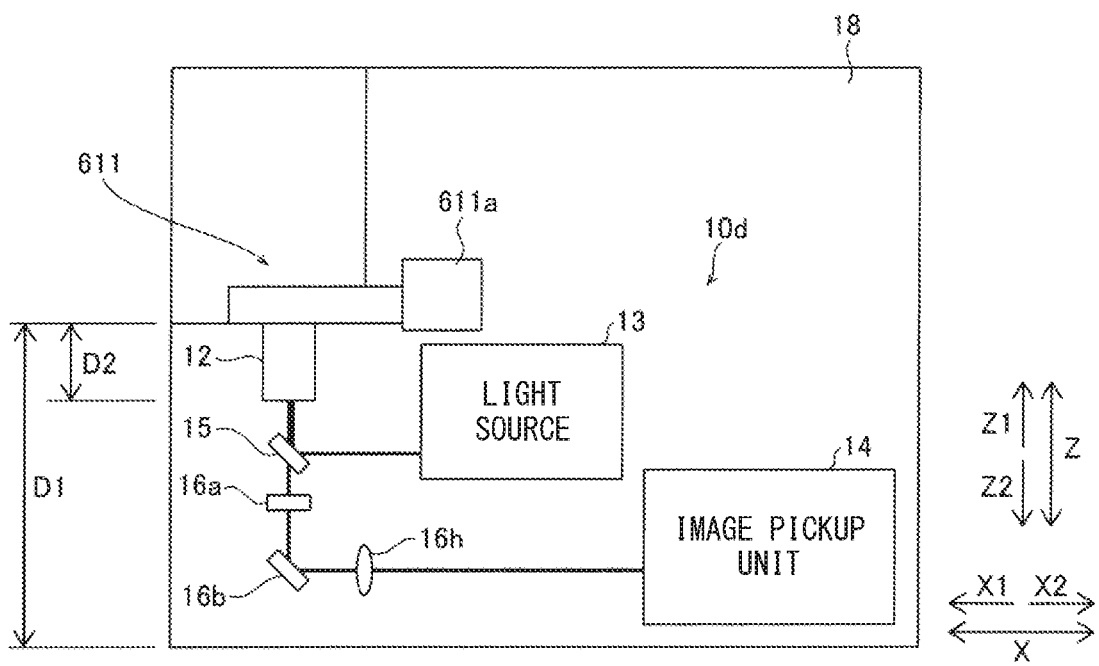
FIG. 16 is a block diagram illustrating a control configuration of the microscope device according to the third modification.

As shown in FIG. 16, on the base plate 18 of the microscope device 600, the object lens 12, the light source 13, the image pickup unit 14, an actuator 611a, the first optical element 15, the filter 16a, the second optical element 16b, and the lens 16h are disposed. The object lens 12 is disposed below (in the Z2 direction) the sample placement unit 611. The sample placement unit 611 is disposed such that a distance D1 between the installation surface of the case 10 and the sample placement unit 611 is longer than a length D2 in the optical axis direction of the object lens 12. Thus, the optical axis of the object lens 12 can be disposed in the up-down direction (Z direction). Therefore, in a case where the sample placement unit 611 is arranged in the horizontal direction, the object lens 12 can be easily made close to a sample in the optical axis direction.

(Structure of Microscope Device According to Fourth Modification)

Next, a structure of a microscope device 700 according to a fourth modification will be described with reference to FIG. 17A, FIG. 17B, and FIG. 18.

As shown in FIG. 17B, the microscope device 700 includes a case 710 and a moving unit 720. In the case 710, a sample placement unit 711 is provided. The moving unit 720 has a display unit 721 integrated therewith. As shown in FIG. 17B, the moving unit 720 is disposed on the front surface side (side in the Y1 direction) of the case 710. The moving unit 720 has a flat plate shape that extends along the plane (XZ-plane) perpendicular to the installation surface of the case 710.

The moving unit 720 slides along the horizontal direction (X direction) to be movable to the light-shielding position and to the opening position. As shown in FIG. 17B, in a case where the moving unit 720 is at the opening position, the sample placement unit 711 is opened at the front side (side in the Y1 direction). The sample placement unit 711 is disposed on the side in the X1 direction of the case 710. The sample placement unit 711 is disposed on the lower side (side in the Z2 direction) of the case 710 in the up-down direction (Z direction).

Figure 18:
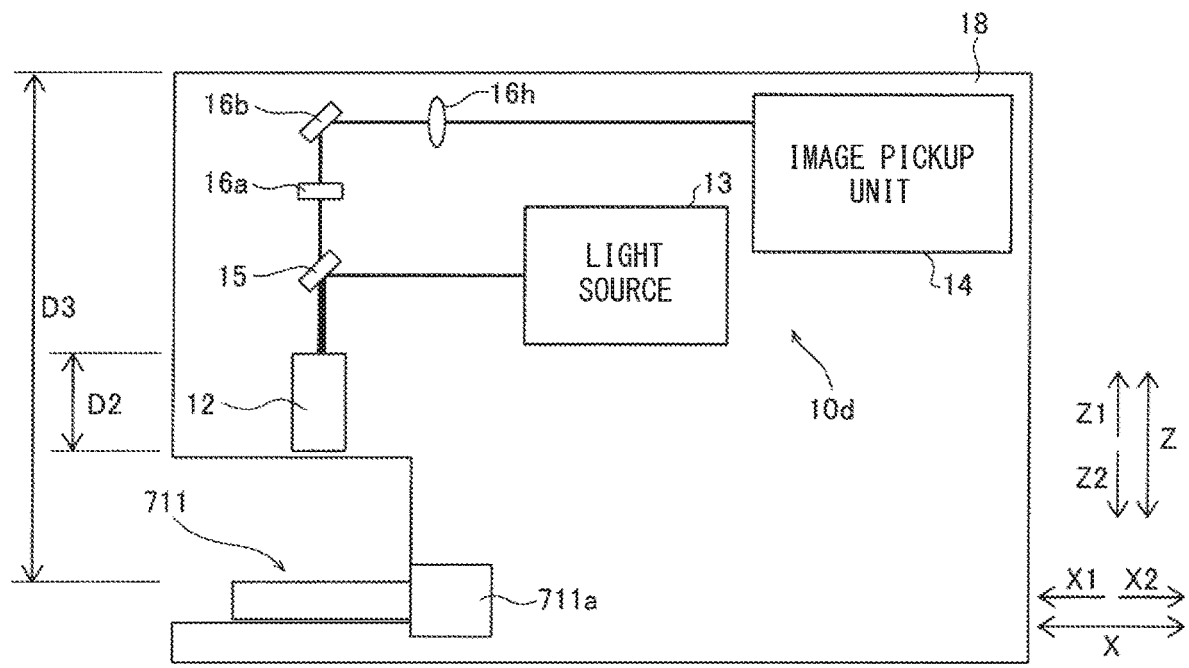
FIG. 18 is a block diagram illustrating a control configuration of the microscope device according to the fourth modification.

As shown in FIG. 18, on the base plate 18 of the microscope device 700, the object lens 12, the light source 13, the image pickup unit 14, an actuator 711a, the first optical element 15, the filter 16a, the second optical element 16b, and the lens 16h are disposed. The object lens 12 is disposed above (in the Z1 direction) the sample placement unit 711. The sample placement unit 711 is disposed such that a distance D3 between the upper surface of the case 10 and the sample placement unit 711 is longer than the length D2 in the optical axis direction of the object lens 12.

By the moving unit being rotated relative to the case, the moving unit may be moved to the light-shielding position and to the opening position. Alternatively, by the moving unit being rotated relative to the case and translated, the moving unit may be moved to the light-shielding position and the opening position.

(Example of Configuration of Light Source)

Next, an example of a configuration of the light source 13 will be described with reference to FIG. 19.

Figure 19:
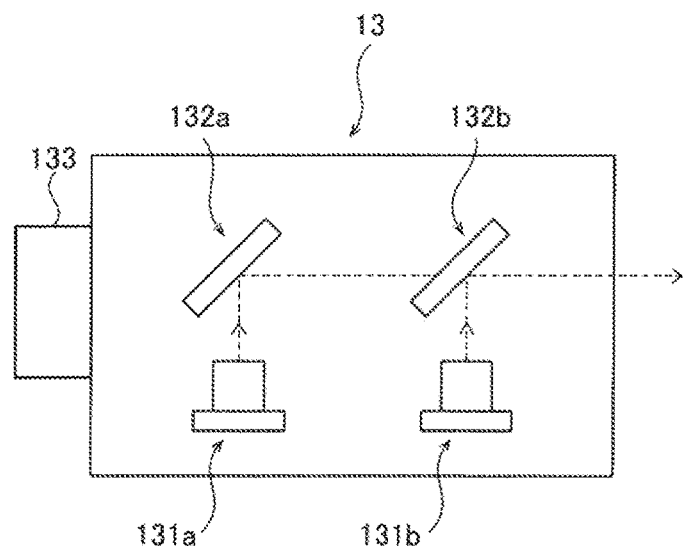
FIG. 19 is a block diagram illustrating an example of a configuration of a light source of the microscope device.

As shown in FIG. 19, the light source 13 includes a first light source 131a, a second light source 131b, a mirror 132a, a dichroic mirror 132b, and a fan 133. The first light source 131a and the second light source 131b output lights having different wavelengths, respectively. The first light source 131a outputs light in a certain wavelength region. The second light source 131b outputs light in a specific wavelength region that is different from that for the first light source 131a. Each of the first light source 131a and the second light source 131b can output laser light. Light outputted by each of the first light source 131a and the second light source 131b may be light in a visible light region, or light in an invisible light region such as an infrared region or an ultraviolet region.

The light outputted by the first light source 131a is reflected by the mirror 132a, is transmitted through the dichroic mirror 132b, and is outputted from the light source 13. The light outputted by the second light source 131b is reflected by the dichroic mirror 132b, and is outputted from the light source 13. Thus, the light outputted by the first light source 131a and the light outputted by the second light source 131b are outputted from the light source 13 in a state where the optical axes thereof coincide with each other.

The first light source 131a applies to a sample, light having a wavelength that allows a part of a plurality of dyes that bind to the sample to be activated. The second light source 131b applies to the sample, light having a wavelength that allows a plurality of activated dyes to be deactivated. The image pickup unit 14 takes an image of light emitted from the part of activated dyes among the plurality of dyes. Thus, an image can be taken on the basis of emission of light from the part of the activated dyes. The image pickup unit 14 takes an image of the sample multiple times. The display unit 21 displays an image obtained by a plurality of images taken by the image pickup unit 14 being combined.

A part of the plurality of dyes that bind to the sample emits light. The dyes bind to molecules, respectively, of a cell for each molecule. Fluorescence images taken by the dyes being sequentially excited multiple times are superimposed on each other by positions of the fluorescence of the dyes being accurately obtained. In this case, the position of the fluorescence of the dye is obtained accurately for each molecule. The fluorescence images obtained with the one-molecule-based positional accuracy are superimposed on each other. Thus, a super-resolution image having a resolution higher than the limitation of the resolution can be obtained.

The fan 133 is disposed inside the case 10 for cooling the light source 13. Specifically, when the fan 133 is driven, the fan 133 operates to generate air flow around the light source 13, and to remove heat generated from the light source 13. The operation of the fan 133 is halted while the image pickup unit 14 is taking an image of a sample. Thus, vibration of the fan 133 can be prevented from being transmitted to the image pickup unit 14, the sample placement unit 11, and the like while an image is being taken. Therefore, an image of the sample can be accurately taken.
(Example of Display Screen Displayed on Display Unit)

Next, an example of a display screen displayed on the display unit 21 will be described with reference to FIG. 20.

Figure 20:
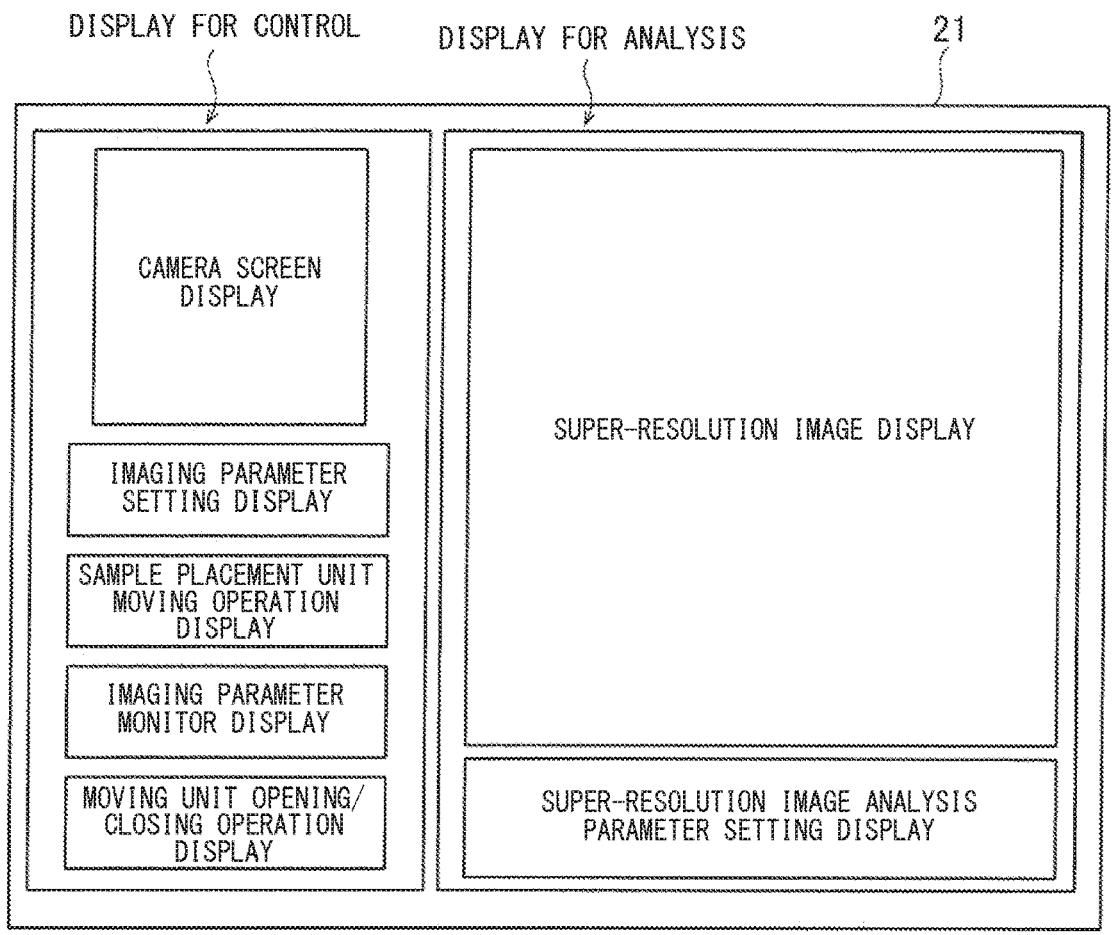
FIG. 20 illustrates an example of a display screen of a display unit of the microscope device.

In the example of a display screen shown in FIG. 20 in the microscope device 100, when an image of a sample is taken, a display for control and a display for analysis are displayed on the display unit 21. The display for control includes a camera screen display, an imaging parameter setting display, a sample placement unit moving operation display, an imaging parameter monitor display, and a moving unit opening/closing operation display. The display for analysis includes a super-resolution image display and a super-resolution image analysis parameter setting display.

On the camera screen display, a camera screen of an image taken by the image pickup unit 14 is displayed in real time. On the imaging parameter setting display, an imaging parameter for an imaging process by the microscope device 100 is displayed. On the imaging parameter setting display, for example, display for adjusting power of laser light outputted by the light source 13 is displayed. On the sample placement unit moving operation display, for example, an operation screen for allowing the position of the sample placement unit 11 to be changed is displayed. On the imaging parameter monitor display, monitor information is displayed. On the imaging parameter monitor display, for example, the position of the sample placement unit 11, power of laser light from the light source 13, the temperature of the image pickup unit 14, an imaging time, and a time until the end of the imaging are displayed. On the moving unit opening/closing operation display, for example, an operation screen that allows the moving unit 20 to be moved to the light-shielding position and to the opening position is displayed.

On the super-resolution image display, a super-resolution image is displayed. Data of the super-resolution image has a size of about thousands of pixels squared to about tens of thousands of pixels squared. The greater the size of the display unit 21 is, the greater the display area for the super-resolution image display can be. Therefore, the area of the display unit 21 is preferably great. On the super-resolution image analysis parameter setting display, an analysis parameter for super-resolution imaging is displayed. On the super-resolution image analysis parameter setting display, for example, the order in which laser lights outputted from the light source 13 are applied, and the number of taken images, are displayed.
(Image Taking Process Operation)

An image taking process operation performed by the microscope system 300 will be described with reference to FIG. 21.

Figure 21:
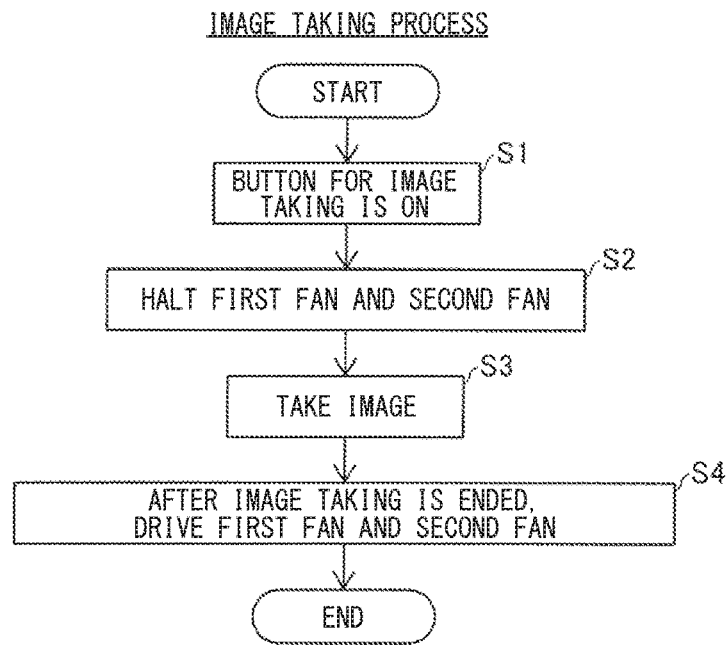
FIG. 21 is a flow chart showing an example of an image taking process.

Firstly, when, in step S1 shown in FIG. 21, a button for image taking is ON according to an operation performed by a user, the control unit 200 performs in step S2, control for halting driving of the fans 193 and the fan 133 via the controller 192. In step S3, the control unit 200 performs control for causing the image pickup unit 14 to take an image of a sample. A plurality of images of the sample are taken. For example, in step S3, about thousands to about tens of thousands of images of the sample are taken.

In step S4, after the image taking is ended, the control unit 200 performs control for driving the fans 193 and the fan 133 via the controller 192. Thereafter, the image taking process operation is ended.

(Super-Resolution Image Taking Process Operation)

A super-resolution image taking process operation performed by the microscope system 300 will be described with reference to FIG. 22.

Figure 22:
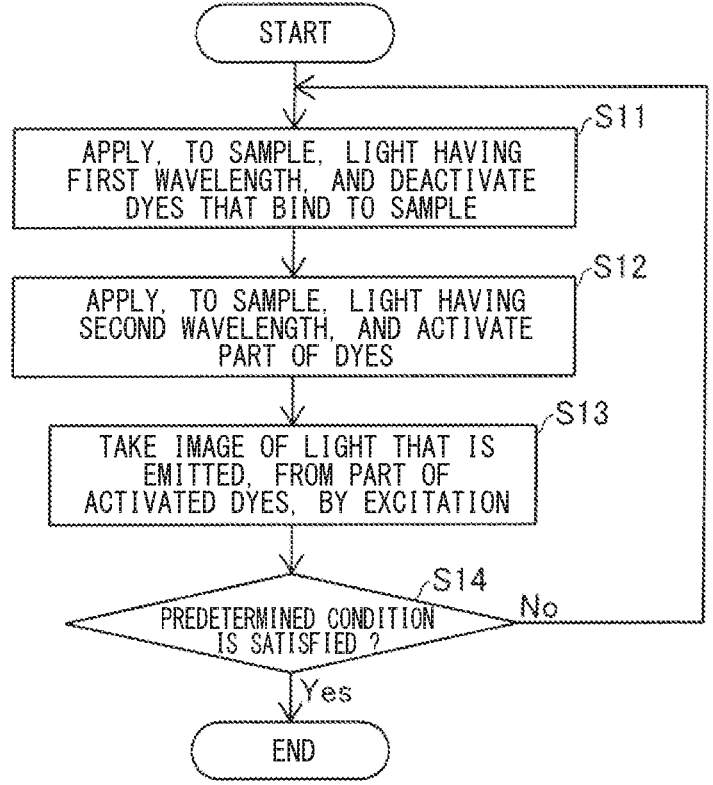
FIG. 22 is a flow chart showing an example of a super-resolution image taking process.

Firstly, in step S11 shown in FIG. 22, the control unit 200 performs control for applying to a sample, light having a first wavelength via the controller 192. Specifically, light outputted by the second light source 131b is applied to the sample. Thus, fluorescent dyes that bind to the sample are deactivated. That is, the light of the fluorescent dyes that bind to the sample is extinguished. In step S12, the control unit 200 performs control for applying to the sample, light having a second wavelength via the controller 192. Specifically, light outputted by the first light source 131a is applied to the sample. Thus, a part of fluorescent dyes which bind to the sample is activated.

In step S13, the control unit 200 performs control for causing the image pickup unit 14 to take an image of light emitted from the part of the activated fluorescent dyes by excitation. In step S14, the control unit 200 determines whether or not the image taken by the image pickup unit 14 satisfies a predetermined condition. When the condition is satisfied, the super-resolution image taking process is ended. When the condition is not satisfied, the process is returned to step S11 and the process steps of steps S11 to S14 are repeated.
(Super-Resolution Image Generating Process Operation)

A super-resolution image generating process operation performed by the microscope system 300 will be described with reference to FIG. 23.

Figure 23:
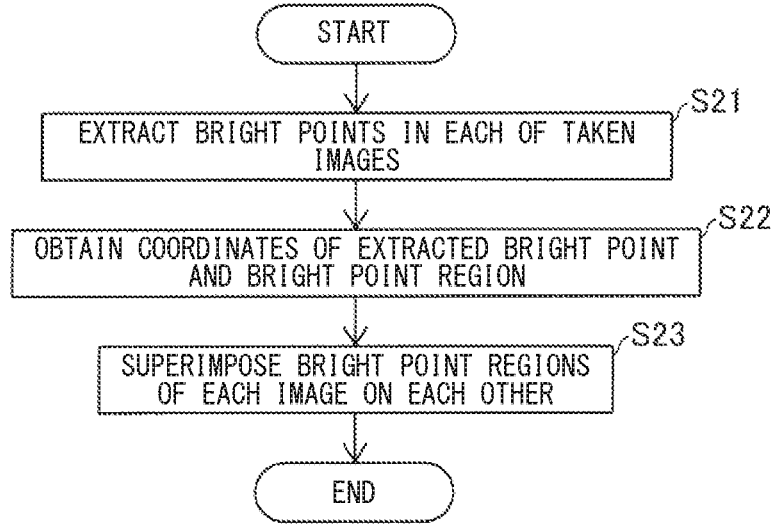
FIG. 23 is a flow chart showing an example of a super-resolution image generating process.
Figure 24:
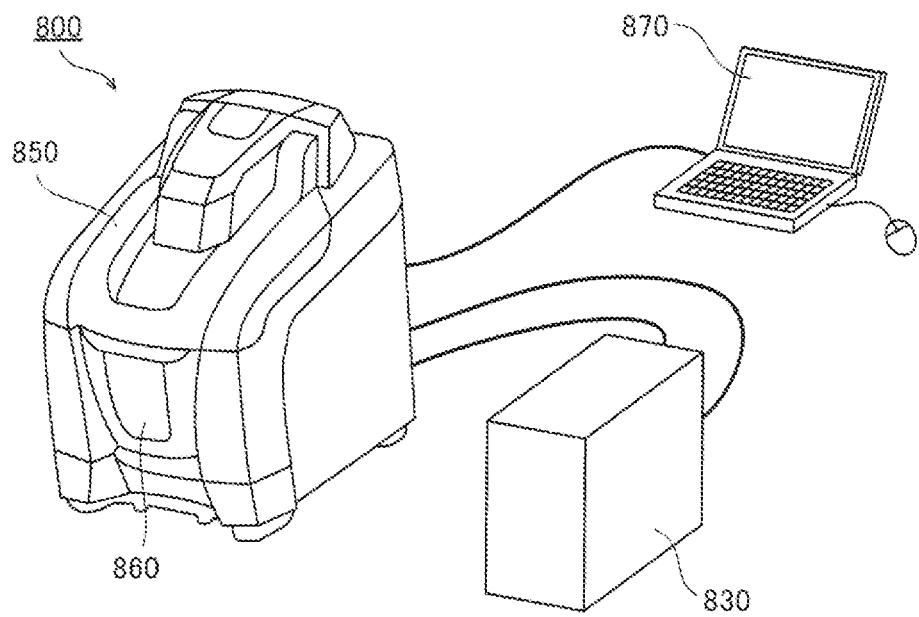
FIG. 24 is a perspective view of a conventional microscope device.
Figure 25:
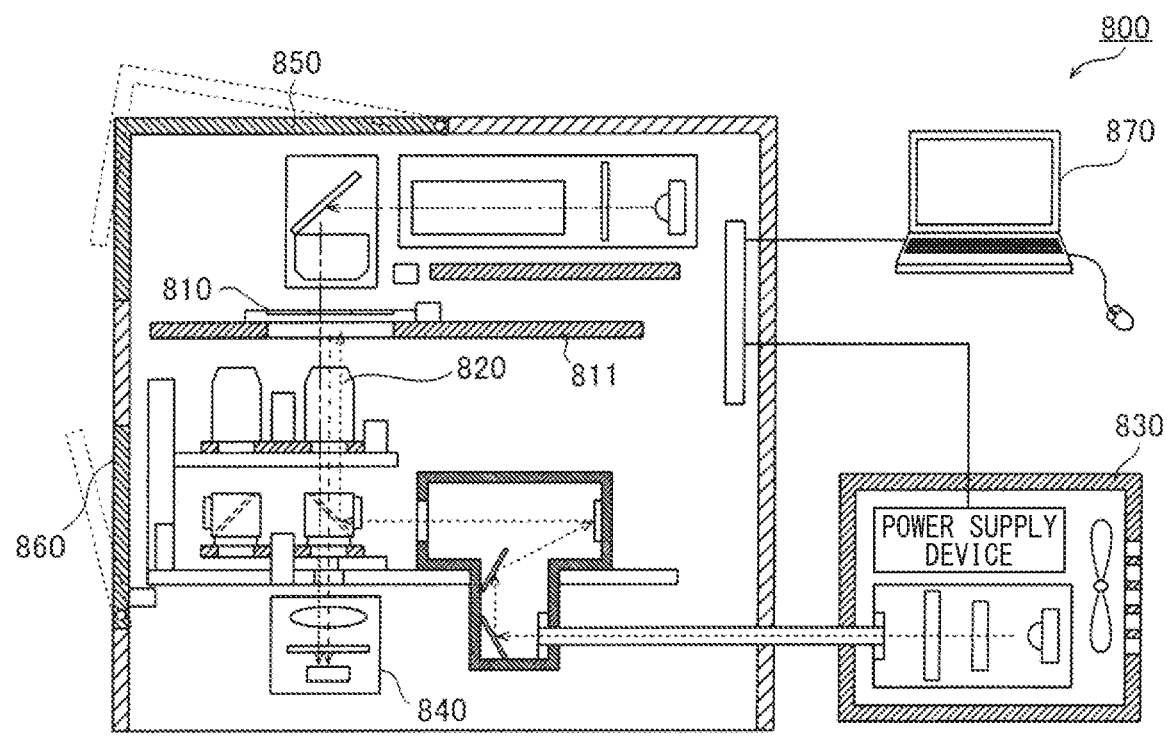
FIG. 25 is a block diagram illustrating a conventional microscope device.

Firstly, in step S21 shown in FIG. 23, the control unit 200 extracts bright points of fluorescence in each of the taken images. Specifically, bright points of fluorescence in the taken image are extracted by Gauss fitting. In step S22, the control unit 200 obtains coordinates of the extracted bright points. That is, positions of pixels of the bright points on the image are obtained. Specifically, coordinates of each bright point are obtained in the two-dimensional plane. A region of the bright point on the image is obtained. Specifically, in a case where matching with a reference waveform in a predetermined range is obtained through Gauss fitting for each fluorescence region on the taken image, the bright point region having a width corresponding to the range is assigned to each bright point. To the bright point in the fluorescence region which matches with the reference waveform at one point, a bright point region having a minimum level of width is assigned.

In step S23, the control unit 200 causes the bright point regions of each image to be superimposed. The control unit 200 causes the bright point regions of the obtained bright points for all the images to be superimposed, thereby generating a super-resolution image. Thereafter, the super-resolution image generating process is ended.

Note that the embodiments disclosed herein are merely illustrative in all aspects and should not be construed as being restrictive. The scope of the present invention is defined not by the description of the above embodiments but by the appended claims, and includes meaning equivalent to the scope of the claims and all changes (modifications) within the scope.

For example, a lid portion for covering the sample placement unit 11, for example, a shutter, may be provided separately from the moving unit 20. In this case, the lid portion (shutter) may be closed in conjunction with movement of the moving unit 20 to cover the sample placement unit 11. In this case, light-shielding may be performed doubly by the moving unit 20 and the lid portion (shutter), and in a case where the lateral side of the moving unit 20 is opened, the sample placement unit 11 may be shielded from light by only the lid portion (shutter).

The light source may not be provided inside the case 10, and may be provided outside the case 10.

An object lens that faces downward may be used instead of the object lens 12 that faces upward.

What is claimed is:

1. A microscope device comprising:
    a sample placement unit configured to receive a sample set thereon;
    an imaging unit operable to take an image of the sample that is set on the sample placement unit;
    a case configured to store the sample placement unit and the imaging unit;
    a cover shaped to cover the case and movable relative to the case, wherein the cover comprises a planar front exterior surface; and
    a display unit provided in the planar front exterior surface of the cover to display thereon the image of the sample taken by the imaging unit,
    wherein the cover is supported by the case and is movable between a first position where the sample placement unit is covered and light-shielded by the cover and a second position where the sample placement unit is exposed to an outside of the microscope device.

2. The microscope device of claim 1, wherein the cover moves relative to the sample placement unit by sliding relative to the case.

3. The microscope device of claim 1, wherein the cover comprises:
    a horizontal surface that extends in a horizontal direction and covers the sample placement unit from thereabove,
    wherein the planar front exterior surface extends in a direction intersecting the horizontal surface, and that covers the sample placement unit from a side in one direction of the horizontal direction.

4. The microscope device of claim 3, wherein the sample placement unit is disposed in the case at a position lower than the horizontal surface of the cover.

5. The microscope device of claim 1, wherein the display unit is disposed over substantially an entirety of the planar front exterior surface.

6. The microscope device of claim 1, further comprising:
    a base plate disposed inside the case,
    wherein the imaging unit is disposed on the base plate,
    wherein the sample placement unit further comprises a sample setting surface configured to receive the sample set thereon,
    wherein the imaging unit comprises an object lens disposed such that an optical axis of the object lens is approximately perpendicular to the sample setting surface, and
    wherein the base plate is disposed so as to be approximately parallel to the optical axis of the object lens.

7. The microscope device of claim 1, wherein the planar front exterior surface and the display unit provided thereon are tilted relative to a vertical direction.

8. The microscope device of claim 1, wherein the sample placement unit is disposed in an approximately horizontal upper surface of the case.

9. The microscope device of claim 1, wherein the sample placement unit is disposed near an end portion of the case in a direction in which the cover is movable between the first position and the second position.

10. The microscope device of claim 1, wherein the cover is movable between the first position and the second position in a horizontal direction.

11. The microscope device of claim 1, further comprising:
    a fan, disposed inside the case, configured to cool an inside of the case, wherein the fan is disposed inside the case in a first region partitioned from a second region in which the imaging unit is disposed, and
    wherein the fan is configured to halt while the imaging unit is taking the image of the sample.

12. The microscope device of claim 1, wherein the imaging unit further comprises:
    a light source;
    an object lens;
    an image pickup unit;
    a first optical element; and
    a second optical element,
    wherein the first optical element reflects light from the light source in an optical axis direction of the object lens and transmits light from the sample therethrough, and
    wherein the second optical element reflects the light from the sample toward the image pickup unit.

13. The microscope device of claim 1, wherein the imaging unit further comprises:
    a first light source; and
    a second light source,
    wherein the first light source applies, to the sample, light having a first wavelength that allows a part of a plurality of dyes that bind to the sample to be activated, and
    wherein the second light source applies, to the sample, light having a second wavelength that allows a plurality of activated dyes to be deactivated.

14. The microscope device of claim 13, wherein the imaging unit is further configured to take an image of light emitted from the activated dyes that are a part of the plurality of dyes.

15. The microscope device of claim 13, wherein the imaging unit is further configured to take a plurality of images of the sample, and wherein the display unit is further configured to display a combined image obtained by combining the plurality of images.

16. The microscope device of claim 1, wherein the case has an internal space that is elongated in one direction, and
    wherein the imaging unit further comprises:
        an object lens
        a light source; and
        an image pickup unit,
        wherein the object lens is disposed such that an optical axis of the object lens is approximately perpendicular to a longitudinal direction of the case, and
        wherein the light source and the image pickup unit are disposed on a same side of the case, in the longitudinal direction of the case, as the object lens.

17. A microscope system comprising a microscope device, wherein the microscope device comprises:
    a sample placement unit configured to receive a sample set thereon;
    an imaging unit operable to take an image of the sample that is set on the sample placement unit;
    a case configured to store the sample placement unit and the imaging unit, the case comprising a window through which the sample placement unit is accessible from outside of the microscope device to allow the sample to be set on the sample placement unit;

a cover shaped to cover the case and movable relative to the case, wherein the cover comprises a planar front exterior surface; and a display unit provided in the planar front exterior surface of the cover to display thereon the image of the sample taken by the imaging unit, wherein the cover is supported by the case and is movable between a first position where the window of the case is closed by the cover and a second position where the window of the case is exposed for access to the sample placement unit from outside of the microscope device.

18. A microscope device comprising:

a base body comprising a sample placement unit configured to receive a sample set thereon and an imaging unit operable to take an image of the sample that is set on the sample placement unit, the base body comprising a window through which the sample placement unit is accessible from outside of the microscope device to set the sample on the sample placement unit; and a moving unit mounted on the base body to cover at least an upper surface and a front surface of the base body, the moving unit comprising a display unit provided in a front exterior surface of the moving unit to display thereon the image of the sample taken by the imaging unit, wherein the moving unit is operable to move relatively to the base body between a first position where the window of the base body is closed by the moving unit and a second position where the window of the base body is exposed for access to the sample placement unit from outside of the microscope device.

* * * * *